US011399119B2

(12) United States Patent
Une et al.

(10) Patent No.: US 11,399,119 B2
(45) Date of Patent: Jul. 26, 2022

(54) INFORMATION PROCESSING APPARATUS AND NON-TRANSITORY COMPUTER READABLE MEDIUM STORING PROGRAM FOR COLOR CONVERSION

(71) Applicant: FUJIFILM Business Innovation Corp., Tokyo (JP)

(72) Inventors: Kiyoshi Une, Kanagawa (JP); Seiji Shiraki, Kanagawa (JP); Nagamasa Misu, Kanagawa (JP); Ryosuke Tsuji, Kanagawa (JP); Yushiro Tanaka, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 277 days.

(21) Appl. No.: 16/352,866

(22) Filed: Mar. 14, 2019

(65) Prior Publication Data

US 2019/0364172 A1    Nov. 28, 2019

(30) Foreign Application Priority Data

May 23, 2018    (JP) .............................. JP2018-098947

(51) Int. Cl.
*G03F 3/08*    (2006.01)
*H04N 1/60*    (2006.01)
(Continued)

(52) U.S. Cl.
CPC ............. *H04N 1/6075* (2013.01); *G06T 7/90* (2017.01); *H04N 1/54* (2013.01); *H04N 1/6002* (2013.01)

(58) Field of Classification Search
None
See application file for complete search history.

(56) References Cited

U.S. PATENT DOCUMENTS 7,729,534 B2  6/2010 Maeda
8,620,072 B2  12/2013 Tomohiro
(Continued)

FOREIGN PATENT DOCUMENTS

CN    1674035    9/2005
CN    101295359    10/2008
(Continued)

OTHER PUBLICATIONS

"Office Action of Japan Counterpart Application", dated Dec. 21, 2021, with English translation thereof, p. 1-p. 6.
(Continued)

*Primary Examiner* — Dung D Tran
(74) *Attorney, Agent, or Firm* — JCIPRNET

(57) ABSTRACT

An information processing apparatus includes an acquisition unit that acquires a designated color which is designated as a color, which is converted into a specific color, of a pixel among pixels which express an image, a determination unit that determines whether or not a common color area, which is expressed by pixels in a common hue range, expresses prescribed information in the image, and a conversion unit that performs a first conversion process of converting a pixel corresponding to the acquired designated color into a specific color in the common color area which is determined to express the information, and performs a second conversion process of converting a pixel corresponding to a color in a wider hue range than the designated color into a specific color in the common color area which is determined to not express the information.

17 Claims, 14 Drawing Sheets

(51) Int. Cl.
*H04N 1/54* (2006.01)
*G06T 7/90* (2017.01)

(56) References Cited

U.S. PATENT DOCUMENTS

| | | | |
|---|---|---|---|
| 8,773,715 | B2 | 7/2014 | Katayama et al. |
| 10,182,176 | B2 | 1/2019 | Harada |
| 10,194,055 | B2 | 1/2019 | Miyata |
| 2011/0128562 | A1* | 6/2011 | Anazawa ............ G06F 3/04847 358/1.9 |
| 2012/0045126 | A1* | 2/2012 | Tomohiro ........... G06F 3/04847 382/167 |
| 2014/0285674 | A1 | 9/2014 | Takayama |
| 2015/0281520 | A1* | 10/2015 | Sawada .............. H04N 1/40093 358/474 |
| 2019/0045087 | A1* | 2/2019 | Shimamura .............. H04N 1/62 |
| 2019/0238722 | A1* | 8/2019 | Nakashio .............. H04N 1/6025 |

FOREIGN PATENT DOCUMENTS

| | | |
|---|---|---|
| CN | 102377909 | 3/2012 |
| CN | 102572166 | 7/2012 |
| CN | 107431740 | 12/2017 |
| CN | 107528992 | 12/2017 |
| JP | 2001268383 | 9/2001 |
| JP | 2006165685 | 6/2006 |
| JP | 2009194690 | 8/2009 |
| JP | 2010003124 | 1/2010 |
| JP | 2010244372 | 10/2010 |
| JP | 4783007 | 9/2011 |
| JP | 2014207658 | 10/2014 |
| JP | 2017135491 | 8/2017 |

OTHER PUBLICATIONS

"Office Action of China Counterpart Application" with English translation thereof, dated Apr. 28, 2022, p. 1-p. 16.

* cited by examiner

| COLOR | HUE VALUE | SATURATION VALUE | LIGHTNESS VALUE |
|---|---|---|---|
| RED | 345 DEGREES TO 15 DEGREES | 10% TO 100% | 10% TO 90% |
| ORANGE | 15 DEGREES TO 45 DEGREES | 10% TO 100% | 10% TO 90% |
| YELLOW | 45 DEGREES TO 75 DEGREES | 10% TO 100% | 10% TO 90% |
| YELLOW GREEN | 75 DEGREES TO 105 DEGREES | 10% TO 100% | 10% TO 90% |
| GREEN | 105 DEGREES TO 135 DEGREES | 10% TO 100% | 10% TO 90% |
| LIGHT YELLOW | 135 DEGREES TO 165 DEGREES | 10% TO 100% | 10% TO 90% |
| ... | ... | ... | ... |
| WHITE | - | 0% TO 10% | 90% TO 100% |
| ... | ... | ... | ... |
| GRAY | - | 0% TO 10% | 50% TO 60% |
| ... | ... | ... | ... |
| BLACK | - | 0% TO 10% | 0% TO 10% |

FIG. 9A
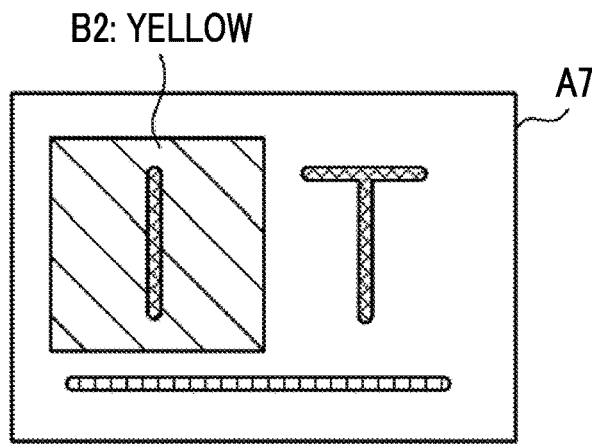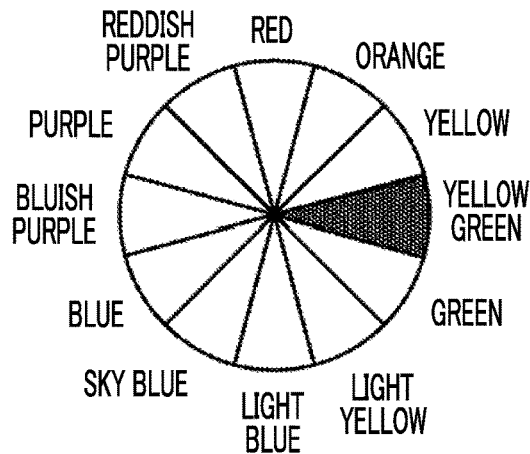
FIG. 9B
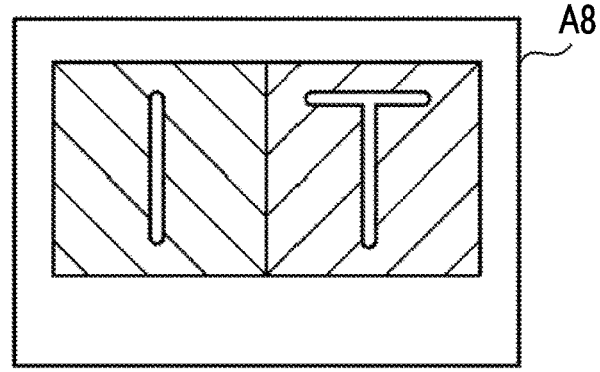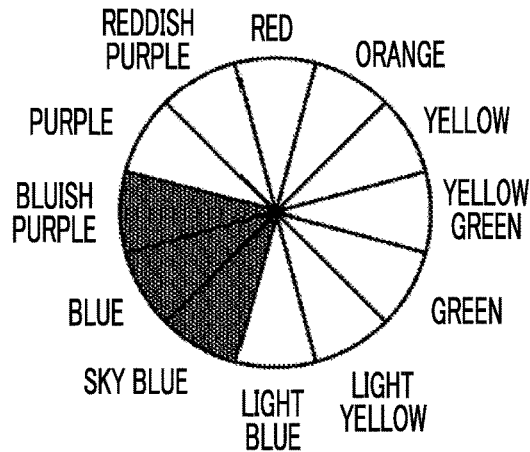
FIG. 10
| SIZE OF COMMON COLOR AREA | HUE RANGE |
|---|---|
| SMALLER THAN F11 | ±15 DEGREES |
| EQUAL TO OR LARGER THAN F11 AND SMALLER THAN F12 | ±20 DEGREES |
| EQUAL TO OR LARGER THAN F12 | ±25 DEGREES |

| SIZE RATIO | HUE RANGE |
|---|---|
| LOWER THAN J11 | ±15 DEGREES |
| EQUAL TO OR HIGHER THAN J11 AND LOWER THAN J12 | ±20 DEGREES |
| EQUAL TO OR HIGHER THAN J12 | ±25 DEGREES |

| DISTANCE | HUE RANGE |
|---|---|
| SHORTER THAN K11 | ±15 DEGREES |
| EQUAL TO OR LONGER THAN K11 AND SHORTER THAN K12 | ±20 DEGREES |
| EQUAL TO OR LONGER THAN K12 | ±25 DEGREES |

INFORMATION PROCESSING APPARATUS AND NON-TRANSITORY COMPUTER READABLE MEDIUM STORING PROGRAM FOR COLOR CONVERSION

CROSS-REFERENCE TO RELATED APPLICATIONS

This application is based on and claims priority under 35 USC 119 from Japanese Patent Application No. 2018-098947 filed May 23, 2018.

BACKGROUND

(i) Technical Field

The present invention relates to an information processing apparatus and a non-transitory computer readable medium storing a program.

(ii) Related Art

There exists a technology referred to as a dropout in which an area corresponding to a designated color is removed from an image. JP4783007B discloses the dropout of a color in which a margin is added to a hue.

SUMMARY

In a case where a color, in which a margin is added to a hue, is designated and a pixel corresponding to the designated color is converted into a specific color as in the technology disclosed in JP4783007B, it is possible to convert a whole area expressed using similar colors. In contrast, there is a case where the amount of information, which is lost because an area on which the color conversion is performed is too wide, increases too much.

Aspects of non-limiting embodiments of the present disclosure relate to an information processing apparatus and a non-transitory computer readable medium storing a program, which prevent the amount of information to be lost due to color conversion, in which a range of a color to be converted may be changed, from being large.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including: an acquisition unit that acquires a designated color which is designated as a color, which is converted into a specific color, of a pixel among pixels which express an image; a determination unit that determines whether or not a common color area, which is expressed by pixels in a common hue range, expresses prescribed information in the image; and a conversion unit that performs a first conversion process of converting a pixel corresponding to the acquired designated color into a specific color in the common color area which is determined to express the information, and performs a second conversion process of converting a pixel corresponding to a color in a wider hue range than the designated color into a specific color in the common color area which is determined to not express the information.

BRIEF DESCRIPTION OF THE DRAWINGS

Exemplary embodiment (s) of the present invention will be described in detail based on the following figures, wherein:

FIGS. 9A and 9B are diagrams illustrating examples of an image acquired through conversion performed using a uniform color conversion process;

FIG. 10 is a diagram illustrating an example of a hue range table;

DETAILED DESCRIPTION

1. Example

Figure 1:
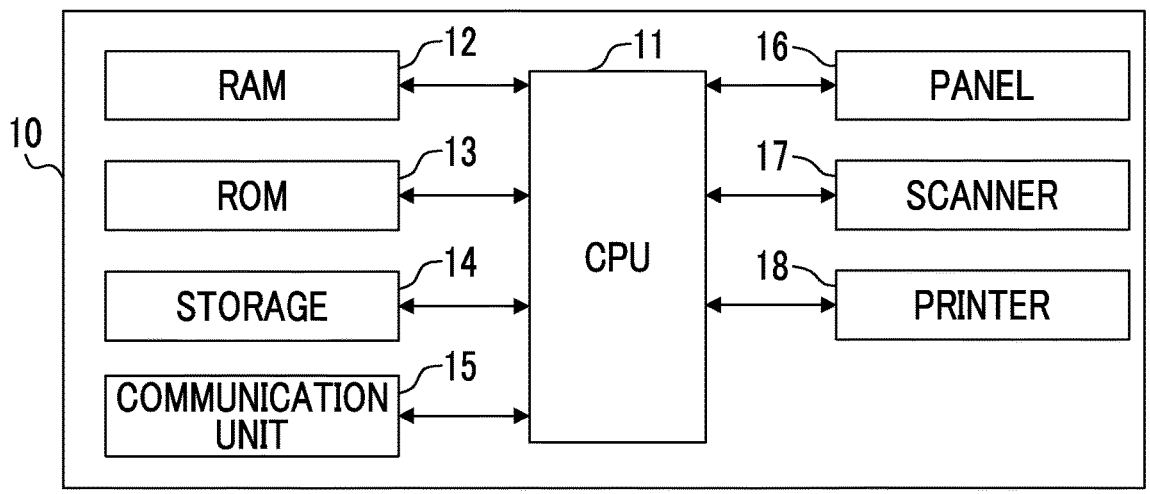
FIG. 1 is a diagram illustrating a hardware configuration of an image processing device according to an Example.

FIG. 1 illustrates a hardware configuration of an image processing device 10 according to an Example. The image processing device 10 is a device which performs image processing on an image read from a document and an image to be printed on paper. In particular, the image processing device 10 performs the image processing (color conversion process) of performing conversion on a designated color area of an image, which is a target of the image processing, with a specific color.

The color conversion process is referred to as a dropout because the color conversion process is frequently used to cause an area having a designated color to be not viewed by converting the designated color into a color of white that is used as a background of an image (it is apparent that the color conversion process is used for another object). The image processing device 10 is a computer which includes a Central Processing Unit (CPU) 11, a Random Access Memory (RAM) 12, a Read Only Memory (ROM) 13, a storage 14, a communication unit 15, a panel 16, a scanner 17, and a printer 18.

The CPU 11 controls respective units by executing a program which is stored in the ROM 13 or the storage 14 while using the RAM 12, which is a memory, as a work area. The storage 14 is a storage section, such as a Hard Disk Drive (HDD), a Solid State Drive (SSD), or a flash memory, and stores data or a program which is used for control by the CPU 11. The communication unit 15 includes a communication circuit or the like, and performs communication (at least one of wireless communication or wired communication) with an external device through a communication line.

The panel 16 is a touch screen in which a touch panel is combined with a screen. The panel 16 receives an operation of a user, and displays an image (an operator image, an image processing target image, or the like). The scanner 17 is an image reading section which includes a light source, an image sensor, and the like, and which optically reads an image that is displayed on a surface of a sheet-shaped document placed on the document glass. The scanner 17 supplies image data, which indicates the read image, to the CPU 11.

The printer 18 is an image forming section in which, for example, a plurality of color toners are accumulated, and which forms a color image by transferring one or more types of toners to a medium, such as the paper, using an electrographic method. The printer 18 forms an image, which is indicated by the image data supplied from the CPU 11, on the medium. In a case where the CPU 11 controls the respective units included in the image processing device 10 by executing the program, functions which will be described later are realized.

Figure 2:
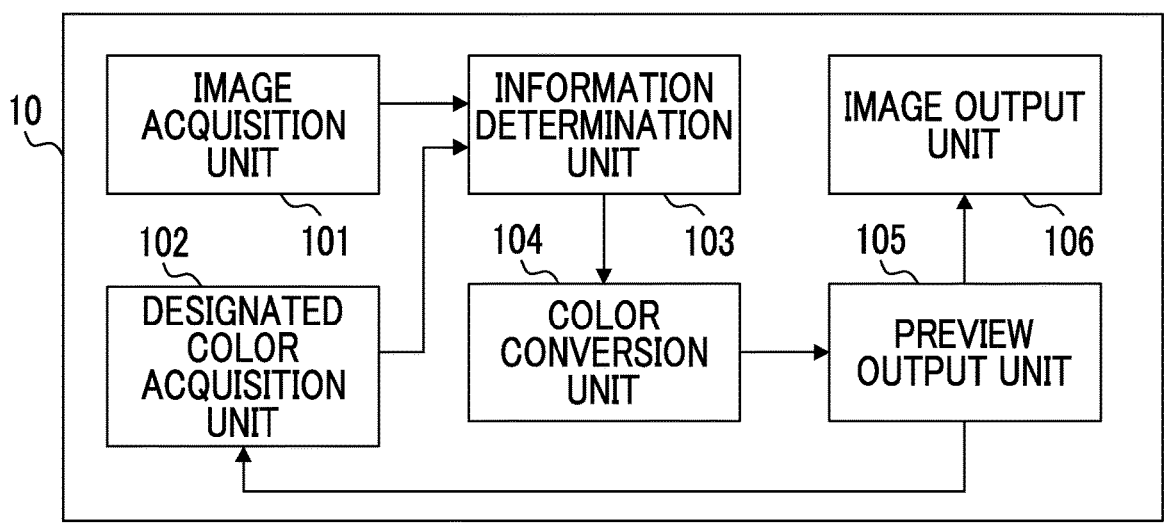
FIG. 2 is a diagram illustrating a functional configuration realized by the image processing device.

FIG. 2 illustrates a functional configuration realized by the image processing device 10. The image processing device 10 includes an image acquisition unit 101, a designated color acquisition unit 102, an information determination unit 103, a color conversion unit 104, a preview output unit 105, and an image output unit 106. The image acquisition unit 101 acquires an image (target image) which is a target of the above-described color conversion process. The image acquisition unit 101 acquires, for example, the image read by the scanner 17, the image formed on the medium by the printer 18, or the like as the target image (image which is a target of the color conversion process).

The designated color acquisition unit 102 acquires the designated color that is designated as a color (a color acquired before conversion is performed in the color conversion process), which will be converted into a specific color, of a pixel in the color conversion process among pixels that express the target image. The designated color acquisition unit 102 is an example of an "acquisition unit" according to the Example of the present invention. Strictly, the designated color acquisition unit 102 acquires information (designated color information) which indicates the designated color. The designated color information is, for example, numerical information which is capable of defining the designated color.

Each of the pixels, which express the image, is expressed by an RGB pixel value. In the Example, the designated color acquisition unit 102 acquires a hue value (in the Example, a value which is equal to or larger than 0° and smaller than 360° in a case where 0° is set to a color of red, 120° is set to a color of green, and 240° is set to a color of blue), a saturation value (in the Example, a value which is equal to or larger than 0% and is equal to or smaller than 100%), and a lightness value (in the Example, a value which is equal to or larger than 0% and equal to or smaller than 100%) as the designated color information in a Hue, Saturation, and Lightness (HSL) model which is indicated based on respective pixel values.

The designated color acquisition unit 102 displays, for example, an operation screen used to designate a color to be converted on the panel 16.

Figure 3A:
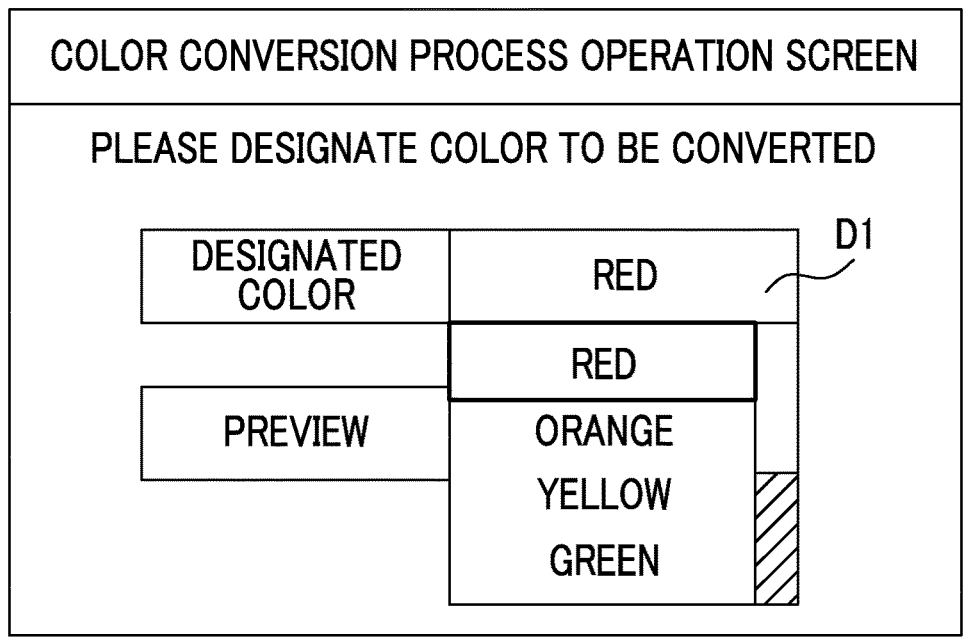
FIGS. 3A and 3B are diagrams illustrating examples of a displayed operation screen.
Figure 3B:
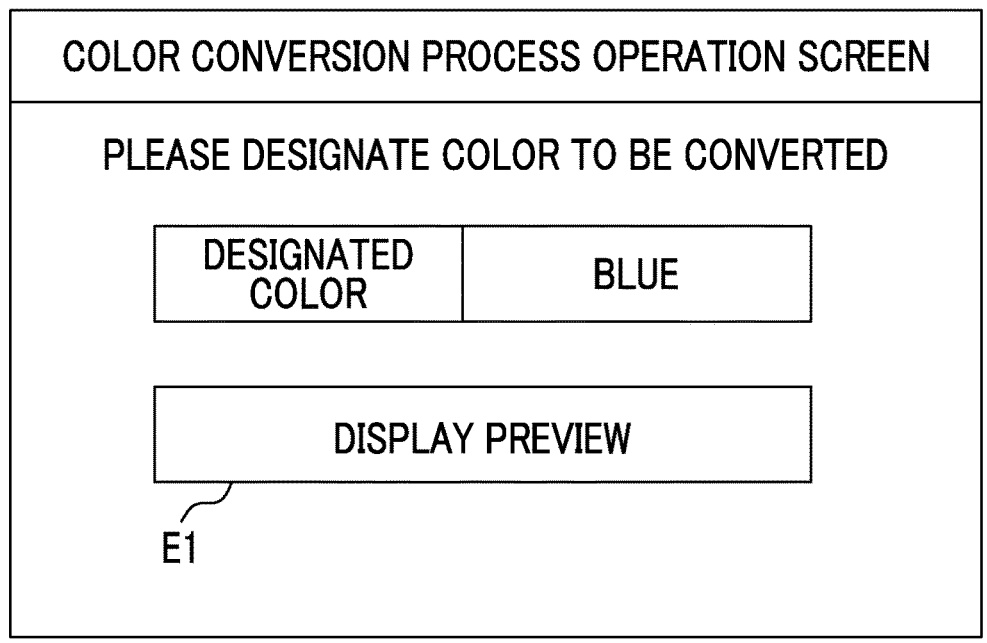

FIGS. 3A and 3B illustrate examples of the displayed operation screen. In the examples of FIGS. 3A and 3B, the designated color acquisition unit 102 displays a text string "please designate a color on which conversion will be performed" and a designated color input field D1 as an operation screen of the color conversion process.

In addition, the designated color acquisition unit 102 displays a preview button E1. In a case where the user performs an operation of inputting a name of a color in the input field D1 and pressing the preview button E1, the designated color acquisition unit 102 determines the color corresponding to the name, which is input to the input field D1, as the designated color, and acquires designated color information which indicates the designated color that is determined. The designated color acquisition unit 102 stores a color table, in which the name of the color is associated with the color information (numerical information which is capable of defining a color), and acquires the color information, which is associated with the same name of the color as the designated color that is determined, as the designated color information.

Figures 4, 5:
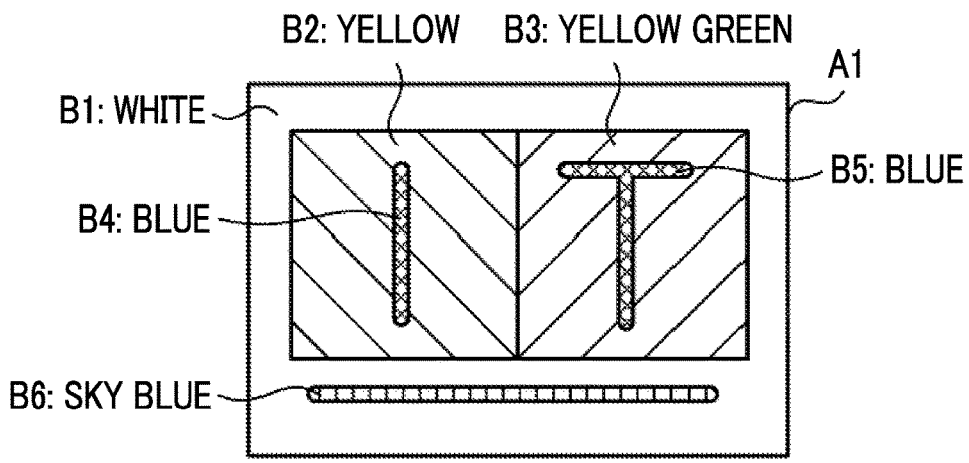
FIG. 4 is a diagram illustrating an example of a color table.
FIG. 5 is a diagram illustrating an example of an acquired target image.

FIG. 4 illustrates an example of the color table. In the example of FIG. 4, a color of white is not related to the hue value, and is associated a saturation value, which is lower than 10%, and a lightness value which is equal to or higher than 90%. A color of black is associated with a saturation value, which is lower than 10%, and a lightness value which is lower than 10%. In addition, a color of gray is associated with a saturation value, which is lower than 10%, and a lightness value which is equal to or higher than 50% and is lower than 60%. Here, it is assumed that a depth of the color of gray has 8 phases which are different from each other according to the lightness value. In addition, in any color having a hue, a saturation value which is equal to or higher than 10% is associated with a lightness value which is equal to or higher than 10% and is lower than 90%, and the color is associated with a hue value having a width of 30°.

For example, a color of red is associated with a hue value which is equal to or higher than 345° and is lower than 15°, a color of orange is associated with a hue value which is equal to or higher than 15° and is lower than 45°, and a color of yellow is associated with a hue value which is equal to or higher than 45° and is lower than 75°. In addition, a color of yellow green is associated with a hue value which is equal to or higher than 75° and is lower than 105°, a color of green is associated with a hue value which is equal to or higher than 105° and is lower than 135°, a color of light yellow (corresponding to spring green) is associated with a hue value which is equal to or higher than 135° and is lower than 165°. Hereinafter, similarly, a color of light blue (corresponding to cyan), a color of sky blue, a color of blue, a color of bluish purple, a color of purple, and a color of reddish purple, which are not illustrated in FIG. 4, are also associated with the hue value having the width of 30°. As described above, in the Example, a whole hue range is equally classified as a 12-color hue range.

The designated color acquisition unit 102 supplies the designated color information, which is acquired using the color table, to the information determination unit 103. The information determination unit 103 determines whether or not a common color area, which is expressed by pixels in a common hue range, expresses prescribed information in the target image acquired by the image acquisition unit 101. The information determination unit 103 is an example of a "determination unit" according to the Example of the present invention. Here, the prescribed information is, for example, information which is expressed using text.

Here, the text includes a code and a symbol in addition to hiragana (Japanese cursive characters), katakana, Chinese characters, numerical characters, Alphabets, text of other countries, and the like. The code includes a period, a comma, parentheses, a unit symbol (% or the like), a numerical code, and the like. The symbol includes a symbol ("+", "−", or the like) which is common to some codes, and a symbol (text code or the like) which is converted into information that is expressed using the text or the code. The size of the text tends to be small, compared to another common color area such as a drawing pattern or a background.

Approximately speaking, there exist two reasons. A first reason is that the text is expressed using one or both of a line and a dot in many cases, and a size of the text tends to be small, compared to the common color area, such as the drawing pattern or the background, which has a surface. A second reason is that the text expresses meaning in a case where a plurality of texts are used instead of single text in many cases, and a size of the text tends to be small, compared to the common color area, such as the drawing pattern or the background, which is easily used separately.

It is apparent that there is a text which has a surface (for example, a music code, a chess code, a white blank number or the like). However, even in the case, the size of the text tends to be small, compared to another common color area due to the second reason. In addition, there is a case where the text is used separately or in small numbers. However, even in the case, the size of the text tends to be small, compared to another common color area due to the first reason. In addition, executively, a map code has a surface and there is a case where the map code is separately used. However, since the map code is shown in a limited area on the map, a size of the map code also tends to be small, compared to another common color area.

FIG. 5 illustrates an example of the acquired target image. FIG. 5 illustrates a target image A1 which includes an outer frame image B1 having a color of white, a background image B2 having a color of yellow, a background image B3 having a color of yellow green, a text image B4 of "I" and a text image B5 of "T" respectively having a color of blue, and an underline image B6 having the color of sky blue. Meanwhile, although outlines of the respective images have the same colors as the insides, the outlines are expressed using black lines in FIG. 5 in order to be easily viewed.

In the Example, the hue range of the designated color, which is acquired by the designated color acquisition unit 102, is set as the above-described common hue range (hue range of pixels which express the common color area), the information determination unit 103 determines to express the above-described information in a case where a size of the common color area of the hue range is smaller than a threshold. The threshold is referred to as a "size threshold" in order to distinguish from other thresholds which will be described below. The size threshold is an example of a "first threshold" according to the Example of the present invention. For example, sizes of the respective common color areas of various images, which include the text, are investigated, and the size threshold is determined based on a maximum value of the sizes (the size threshold may be the maximum value or may be a value acquired by increasing or decreasing the maximum value).

For example, in a case where the color of blue is designated as the designated color for the target image A1, the information determination unit 103 specifies the text images B4 and B5 as the common color area in which the hue range is the color of blue. Since the sizes of the text images B4 and B5 are smaller than the size threshold because the text images B4 and B5 are text, the information determination unit 103 determines that the specified text images B4 and B5 express the prescribed information.

The text images B4 and B5 are images formed using only lines, and thus the sizes are smaller than the size threshold. Therefore, the information determination unit 103 determines that the specified underline image B6 expresses the prescribed information.

In addition, in a case where the color of white is designated as the designated color for the target image A1, the information determination unit 103 specifies the outer frame image B1 as the common color area in which the hue range is the color of white. The outer frame image B1 is an image which is expressed using a surface having an extent instead of the lines and the dots, and thus the size is equal to or larger than the size threshold. Therefore, the information determination unit 103 determines that the specified outer frame image B1 does not express the prescribed information.

In addition, in a case where the color of yellow is designated as the designated color for the target image A1, the information determination unit 103 specifies the background image B2 as the common color area in which the hue range is the color of yellow. Since the background image B2 is an image which is expressed using the surface having the extent, the size is equal to or larger than the size threshold, and thus the information determination unit 103 determines that the specified background image B2 does not express the prescribed information. In a case where the color of yellow green is designated as the designated color, the information determination unit 103 also determines that the background image B3 specified as the common color area does not express the prescribed information.

The information determination unit 103 supplies area information, which expresses the specified common color area, and a result of determination to the color conversion unit 104. The area information is information used to identify a set of pixels which express the specified image, and is expressed using, for example, a set of coordinates of each pixel in a coordinate system (for example, a coordinate system in which an upper left corner is set to an original point, a horizontal direction is set to an x axis, and a vertical direction is set to a y axis) which is prescribed for the target image.

The color conversion unit 104 performs a first conversion process of converting a pixel corresponding to the designated color, which is acquired by the designated color acquisition unit 102, into a specific color in the common color area which is determined to express prescribed information by the information determination unit 103, and performs a second conversion process of converting a pixel corresponding to a color in a wider hue range than the designated color into the specific color in the common color area which is determined to not express the prescribed information. The color conversion unit 104 is an example of a "conversion unit" according to the Example of the present invention.

In a case where the first conversion process or the second conversion process is performed, the color conversion unit 104 generates a new target image, on which the first color conversion process and the and second color conversion process are performed, and generates a new target image as an original target image even in a case where neither the first color conversion process nor the second color conversion process is performed.

Figure 6A:
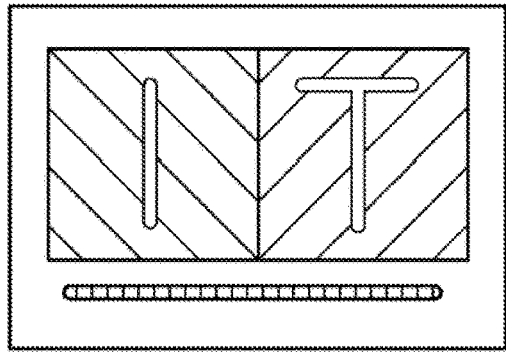
FIGS. 6A to 6D are diagrams illustrating examples of a newly generated target image.
Figure 6A:
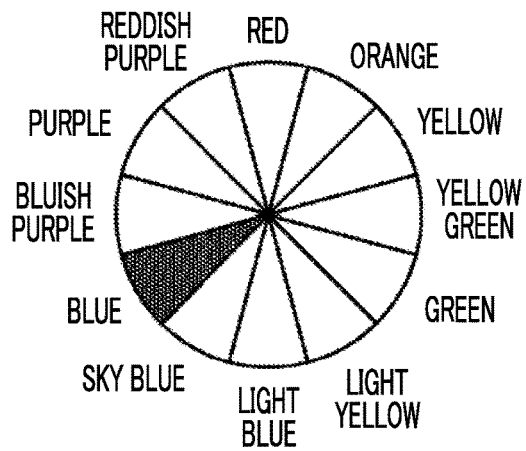

FIGS. 6A to 6D illustrate examples of the generated new target image. In the example of FIG. 6A, in a case where the "color of blue" is acquired as the designated color, the color conversion unit 104 generates a target image A2 acquired through color conversion performed on only the text images B4 and B5, which express "IT", into the color of white corresponding to the specific color. Meanwhile, although an outline of each text, which is originally expressed by a black line, is also converted into the color of white, the outline of each text is expressed using the black line without change in order to cause the common color area, acquired after conversion, to be easily viewed in FIGS. 6A to 6D.

Figure 6B:
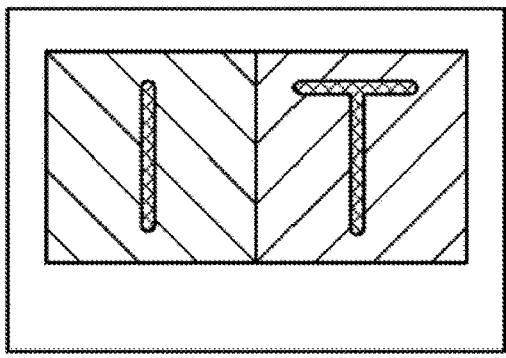
Figure 6B:
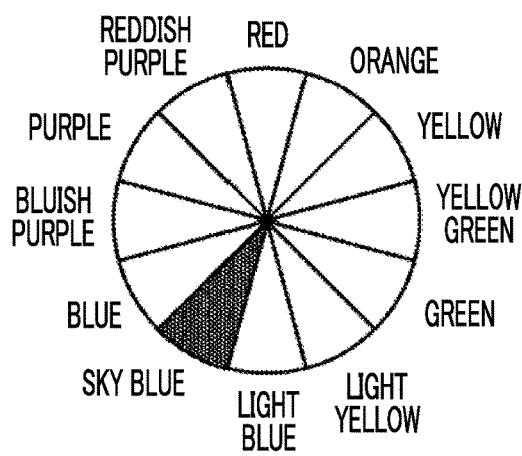

In the example of FIG. 6B, in a case where the "color of sky blue" is acquired as the designated color, the color conversion unit 104 generates a target image A3 acquired through the color conversion performed on only the underline image B6 into the color of white corresponding to the specific color. In this case, since the background of the underline image B6, acquired after conversion is performed, has the color of white, it is not possible to identify boundaries, and thus the underline image B6 is viewed as being disappeared. In the examples in FIGS. 6A and 6B, the colors of the text images B4 and B5, which are determined to express the prescribed information, and the underline image B6 are designated. Therefore, the color conversion unit 104 performs the first conversion process of converting the respective designated colors (the color of blue and the color of sky blue) into the specific color (white).

Figure 6C:
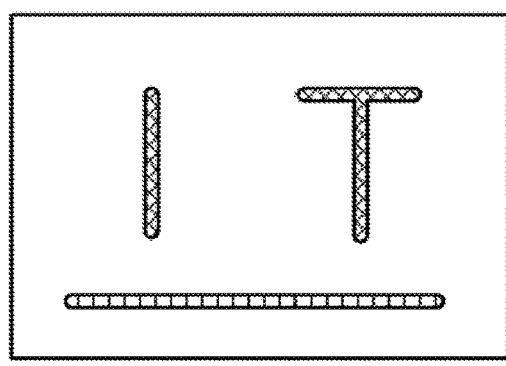
Figure 6C:
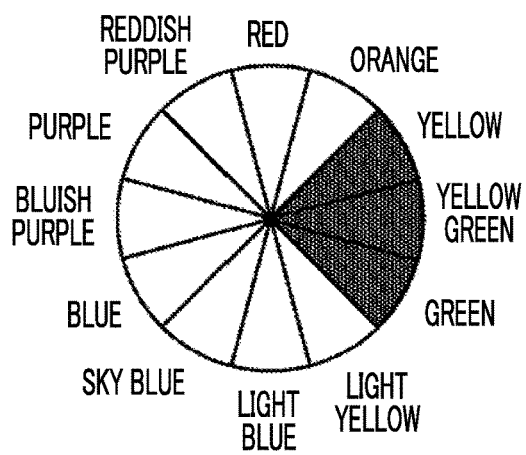

In the example of FIG. 6C, in a case where the "color of yellow green" is acquired as the designated color, the color conversion unit 104 generates a target image A4 which is acquired through the color conversion performed on the background image B3 having the "color of yellow green" and the background image B2 having the "color of yellow" into the color of white corresponding to the specific color. In this case, since the backgrounds of the background images B2 and B3, acquired after conversion is performed, have the color of white, it is not possible to identify boundaries, and thus the background images B2 and B3 are viewed as being disappeared. In this case, a hue range from the "color of yellow" to the "color of green" is the wider hue range (more specifically, the hue range which includes a color adjacent to the designated color in the above-described 12-color hue range) than the "color of yellow green" which is the designated color.

In the example of FIG. 6C, the color of the background image B3, which is determined to not express the prescribed information, is designated. Therefore, the color conversion unit 104 performs the second conversion process of converting the color in the wider hue range (from the color of yellow to the color of green) than each designated color (the color of yellow green) into the specific color (white). In addition, in the example of FIG. 6D, in a case where the "color of green" is acquired as the designated color, the common color area corresponding to the "color of green" does not exist in the target image A1. Therefore, the color conversion unit 104 generates a target image A5, which is not changed from the target image A1, on which neither the first conversion process nor the second conversion process is performed.

The color conversion unit 104 supplies image data, which indicates the new target image generated as described above, to the preview output unit 105. The preview output unit 105 outputs a preview image which indicates a preview of the target image that is newly generated by the color conversion unit 104. The preview output unit 105 outputs the preview image to, for example, the panel 16.

Figure 7:
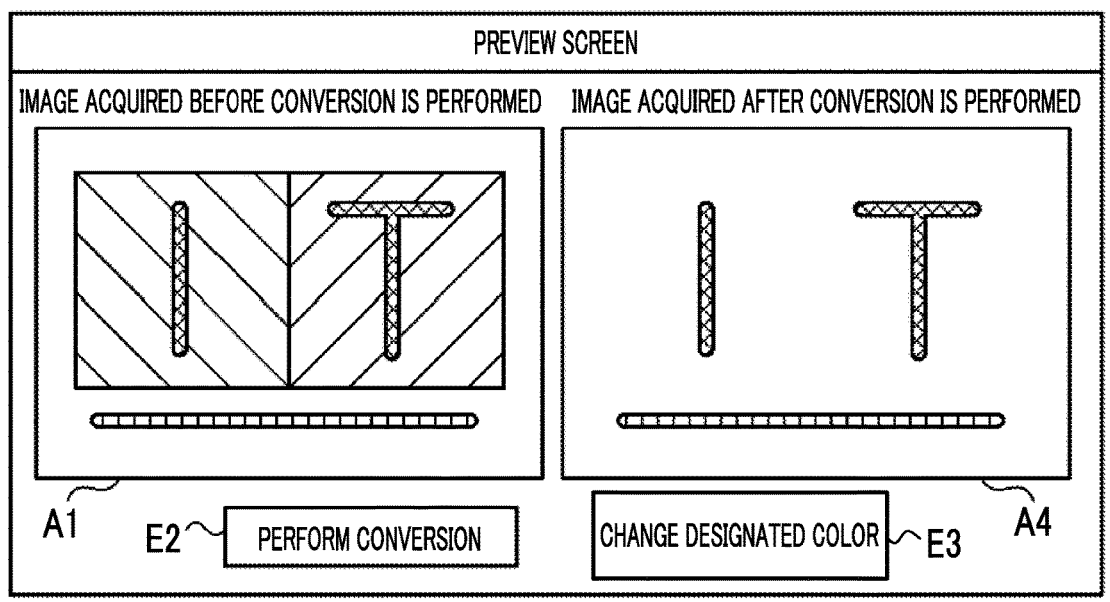
FIG. 7 is a diagram illustrating an example of a preview image.

FIG. 7 illustrates an example of the preview image. In the example of FIG. 7, the panel 16 displays the target image A1 as an image, which is acquired before conversion is performed, and the target image A4 as the image, which is acquired after conversion is performed, on a preview screen.

In addition, the panel 16 displays an operator E2 in which "perform conversion" is written and an operator E3 in which "change designated color" is written. In a case where the operator E3 is operated, the preview output unit 105 instructs the designated color acquisition unit 102 to display a color conversion process operation screen, as illustrated in FIG. 3. In a case where the operator E2 is operated, the preview output unit 105 supplies the image data, which is supplied from the color conversion unit 104, to the image output unit 106 without change.

The image output unit 106 outputs the target image, which is acquired after conversion is performed and is indicated by the supplied image data, that is, an image whose color is converted by the color conversion unit 104. An output destination of the image, which is acquired after conversion is performed, may be, for example, a registered user terminal or may be a medium on which an image is formed by the printer 18. The output destination may be predetermined or may be selected by the user after an operation of performing conversion is performed.

The image processing device 10 performs the color conversion process of performing conversion on a color in an image based on the above-described configuration.

Figure 8:
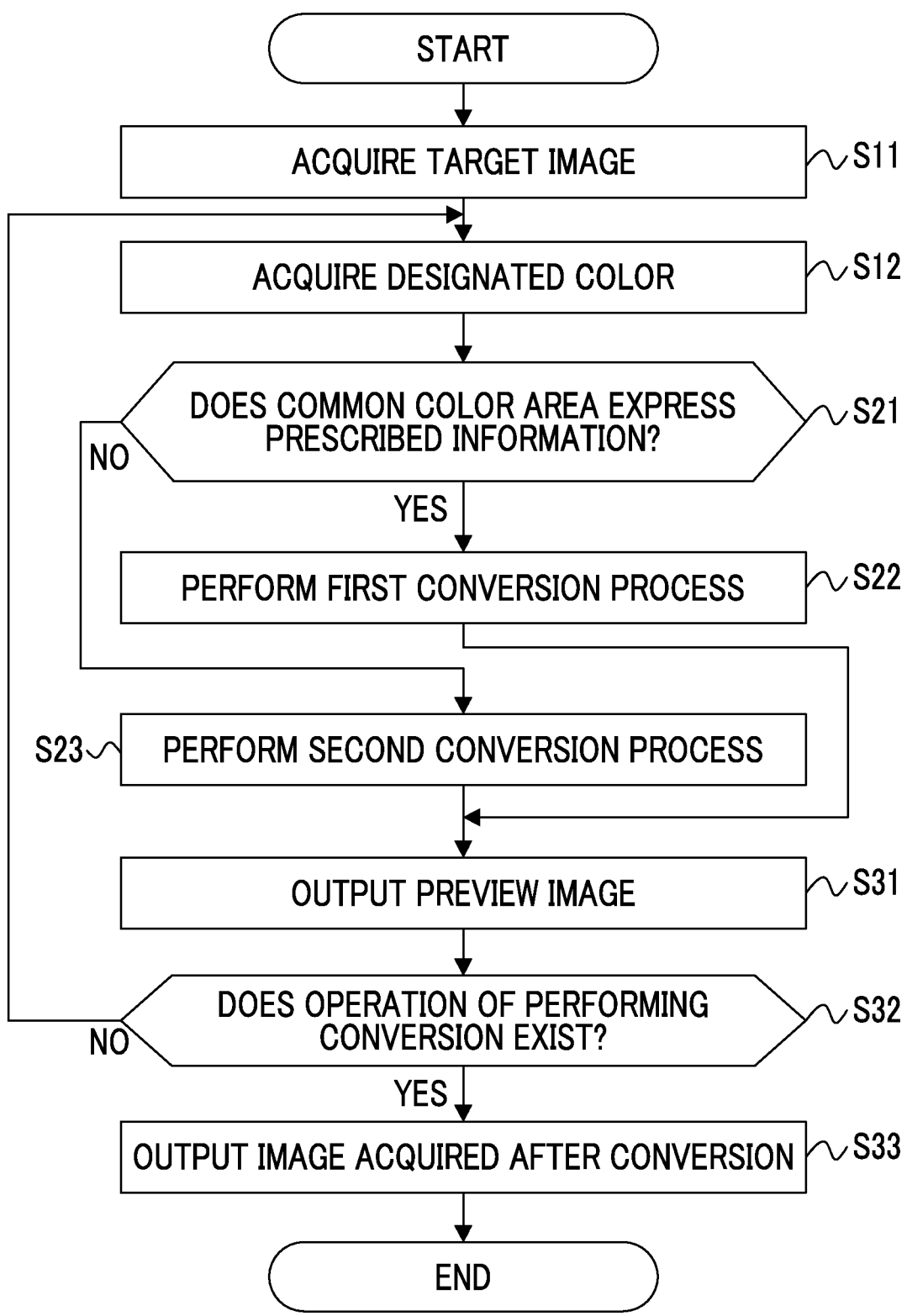
FIG. 8 is a flowchart illustrating an example of an operational sequence in a color conversion process.

FIG. 8 illustrates an example of an operational sequence in the color conversion process. The operational sequence starts in a case where the user performs an operation of designating the target image of the color conversion process. First, the image processing device 10 (image acquisition unit 101) acquires the target image which is the target of the color conversion process (step S11). Subsequently, the image processing device 10 (the designated color acquisition unit 102) acquires a designated color, which is designated as a color of a pixel to be converted into a specific color in the color conversion process, among pixels which express the target image (step S12).

Subsequently, the image processing device 10 (the information determination unit 103) determines whether or not the common color area (area in which the hue range is expressed using common pixels) expresses the prescribed information in the target image acquired in step S11 (step S21). In a case where it is determined that the common color area expresses the prescribed information in step S21 (YES), the image processing device 10 (the color conversion unit 104) performs the first conversion process of converting the pixel corresponding to the designated color into the specific color in the common color area (step S22).

In a case where it is determined that the common color area does not express the prescribed information in step S21 (NO), the image processing device 10 (the color conversion unit 104) performs the second conversion process of converting the pixel corresponding to the color in the wider hue range than the designated color into the specific color in the common color area (step S23). After steps S22 and S23 are performed, the image processing device 10 (the preview output unit 105) outputs the preview image which indicates the target image whose color is converted (step S31).

Subsequently, the image processing device 10 determines whether or not an operation of performing color conversion exists (step S32). In a case where it is determined that the operation of performing conversion does not exist (NO), the image processing device 10 returns to step S12 (acquires the designated color) and performs the operation. In a case where it is determined that the operation of performing conversion exists (YES), the image processing device 10 (image output unit 106) outputs an image in which conversion is performed on the color (step S33), and ends the operational sequence.

In the Example, any of the first conversion process and the second conversion process is performed according to whether or not the common color area expresses the prescribed information, as described above. In contrast, a case where a uniform color conversion process is performed (a case where the first conversion process is normally performed or a case where the second conversion process is normally performed) will be compared.

FIGS. 9A and 9B illustrate examples of an image acquired through conversion performed using the uniform color conversion process.

FIG. 9A illustrates a target image A7, which is acquired after conversion is performed, in a case where the first conversion process is normally performed. In the target image A7, the designated color is the "color of yellow green" and the common color area corresponding to the designated color does not express the prescribed information. Therefore, since only the "color of yellow green" corresponding to the designated color is converted into the specific color, the background image B2 having the color of yellow remains without being converted. For example, in a case where the background images (background images B2 and B3), which include a plurality of colors that are similar colors, are expressed as in the target image A1, conversion is not performed on the images at once in a case where the first conversion process is normally performed.

In contrast, in the Example, in a case where it is determined that the background image does not express the prescribed information, conversion is performed on the color in the wider hue range, and thus conversion is performed on the background images at once as in the target image A4 of FIG. 6C. Meanwhile, for example, in a case where a scan image is used as the target image even though the background images do not originally include a plurality of colors, there is a case where color irregularity is generated in the background images, which have a single color, due to errors in a case where the image is read.

According to a degree of the color irregularity in that case, a case where irregularity parts remain without being converted may occur in the first conversion process. Here, in a case where the second conversion process is performed, the irregularity parts may easily be converted at once, compared to the case where the first conversion process is normally performed. FIG. 9B illustrates a target image A8 which is acquired after conversion is performed and is acquired in a case where the second conversion process is normally performed. The target image A8 has the designated color corresponding to the "color of blue" and the common color area corresponding to the designated color expresses the prescribed information.

Therefore, since the colors (the color of sky blue, the color of blue, and the color of bluish purple) in the wider hue range than the "color of blue" corresponding to the designated color are converted into the specific color, conversion is performed on the underline image B6 having the color of sky blue, and thus the underline image B6 is not viewed. For example, in a case where images, such as the text images B4 and B5 and the underline image B6 of the target image A1, which expresses the prescribed information and which have similar colors, are expressed and the second conversion process is normally performed, conversion is performed on the images at once.

Therefore, information, which is expressed using a color (in the example, the color of sky blue) that is not the designated color (in the example, the color of blue) is lost as in the example of FIG. 9B. In contrast, in the Example, in a case where the common color area corresponding to the designated color expresses the prescribed information, conversion is performed on only the designated color, and thus information, which is expressed using the other colors, is not lost.

2. Modification Example

The above-described Example is only an example of the present invention, and may be modified as below. In addition, the Example and each modification example may be implemented by being combined as needed. Here, each modification example may be implemented by giving a priority (by ranking to determine precedence in a case where events, which compete for implementation of each modification example, are generated). In addition, a common value or the like may be acquired by, for example, combining the modification examples, which use different parameters to acquire the common value or the like, and using the parameters together. Further, a single value may be acquired by adding individually acquired values or the like according to some rules. In addition, here, different weights may be given to the respective parameters to be used.

2-1. Wider Hue Range than Designated Color

In the Example, the color conversion unit 104 performs the second conversion process while using a hue range, which includes a color adjacent to the designated color in a 12-color hue range, as the wider hue range than the designated color. However, the wider hue range than the designated color is not limited thereto. For example, a hue range (in a case where the designated color is the "color of blue", the "color of light blue", the "color of sky blue", the "color of blue", the "color of bluish purple", and the "color of purple"), which includes two colors next to the designated color, may be used as the wider hue range than the designated color.

In addition, the designated color is not limited to the 12-color hue range, and, for example, a range (in a case where the designated color is the "color of blue", the range is equal to or higher than 210° and is lower than 270°) of 30° before and behind a central value (240° in a case of the "color of blue") of the designated color may be the wider hue range than the designated color. In addition, the range may be changed without being fixed. In this case, for example, the color conversion unit 104 enlarges the hue range of the color of the pixel of a conversion source in the second conversion process as the size of the common color area is larger. In this case, for example, the color conversion unit 104 uses a hue range table in which the size of the common color area is associated with information which indicates the hue range.

FIG. 10 illustrates an example of the hue range table. In the example of FIG. 10, a size of the common color area, such as "smaller than F11", "equal to or larger than F11 and smaller than F12" or "equal to or larger than F12" is associated with information (which expresses the hue range with respect to the central value of the designated color) which indicates the hue range such as "±15°", "±20°", or "±25°". The color conversion unit 104 performs the second conversion process while using the hue range, which is associated with the size of the common color area indicated by the area information supplied from the information determination unit 103 in the hue range table, as the hue range (the wider hue range than the designated color) of the color of the pixel of the conversion source.

As described in the Example, there is a high probability that text, that is, the prescribed information is expressed as the size of the common color area is smaller. Here, in a case where the hue range of the color of the pixel of the conversion source is narrowed as the size of the common color area is smaller, the amount of information, which is lost, is prevented from being large (that is, loss of the information is suppressed), compared to the case where the hue range is uniform. In contrast, there is a high probability that the prescribed information is not expressed as the size of the common color area is larger. Therefore, in a case where the hue range of the color of the pixel of the conversion source is enlarged, convenience of the color conversion is improved, compared to the case where the hue range is uniform, by enlarging an area where it is possible to perform the batch conversion on the colors for the common color area, in which the prescribed information is not expressed, while suppressing the loss of the information.

2-2. Text Recognition

The information determination unit 103 may perform determination using a method which is different from the Example. In the modification example, the information determination unit 103 determines to express the prescribed information in a case where the above-described common color area expresses text. In this case, the information determination unit 103 recognizes the text included in the target image using, for example, a text recognition technology such as an Optical Character Recognition (OCR).

In a case where the recognized text is, for example, an area, which includes only pixels having any of colors expressed in the color table illustrated in FIG. 4, the information determination unit 103 determines the area as the common color area which expresses the prescribed information. Meanwhile, in a case where a ratio is small (for example, in a case of being lower than 5% or the like) even in a case where pixels having different colors are included, the information determination unit 103 may determine the area as the common color area which expresses the prescribed information.

In the modification example, in a case where the common color area expresses the text, it is determined to express the prescribed information even in a case where the text is large. Meanwhile, in a case of using a method of performing determination according to the size of the common color area as in the Example, an area which expresses the prescribed information is determined without performing an image recognition process as in the modification example.

2-3. Size Ratio

The information determination unit 103 may perform determination using a method which is different from the above-described each example.

Figures 11, 12:
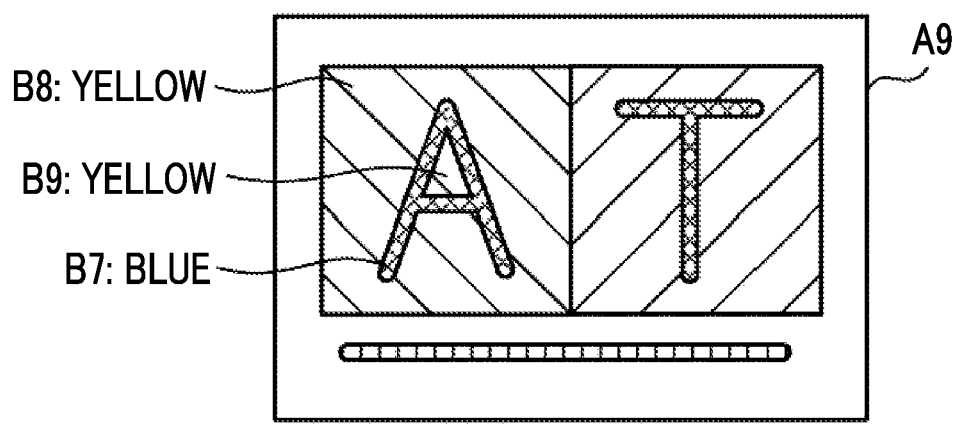
FIG. 11 is a diagram illustrating an example of a target image acquired according to a modification example.
FIG. 12 is a diagram illustrating an example of a hue range table according to the modification example.

FIG. 11 illustrates an example of a target image acquired according to the modification example. FIG. 11 illustrates a target image A9 which is acquired by replacing the text image B4 corresponding to "I" in the target image A1 of FIG. 5 by a text image B7 corresponding to "A" having the color of blue. In a case of a text "A", an area surrounded by the text exists, and thus only the background image B2 forms a background of "A" in FIG. 5. In this case, a background image B8, which is in contact with an outer edge of "A" and which has the color of yellow, and a background image B9, which is contact with an inner edge of "A" and which has the color of yellow, form the background of "A".

Since the background image B9 has a size smaller than the text image B7, it is determined to express the prescribed information regardless that the background image B9 is not the text in a case where the determination method according to the Example is used. Here, in the modification example, the information determination unit 103 performs determination using a size ratio of the common color area. Specifically, in a case where an outer edge of a first common color area is in contact with a second common color area and a size ratio of the first common color area to the second common color area is lower than a threshold, the information determination unit 103 determines that the first common color area expresses the prescribed information.

In order to distinguish the threshold from another threshold, the threshold is referred to as a "size ratio threshold". The size ratio threshold is an example of a "second threshold" according to the Example of the present invention. For example, a size ratio of an area surrounded by the text to the text is investigated, and the size ratio threshold is determined based on a minimum value of the size ratio (the size ratio threshold may be the minimum value or may be a value acquired by increasing or decreasing the minimum value). In a case where the size ratio of the first common color area to the second common color area is equal to or higher than the size ratio threshold acquired as described above, there is a high probability that the first common color area is the area surrounded by the text.

In contrast, in a case where the size ratio is lower than the size ratio threshold, there is a low probability that the first common color area is the area surrounded by the text. For example, in a case where it is assumed that the background image B9 of FIG. 11 is the first common color area, the text image B7 which is in contact with the outer edge is the second common color area. In addition, in a case where it is assumed that the text image B7 is the first common color area, the background image B8 which is in contact with the outer edge is the second common color area. It is assumed that a size ratio of the text image B7 to the background image B8 is lower than, for example, 10% because the text image B7 expressed by a line is relatively smaller than the background image B8 expressed by a surface.

In contrast, a size ratio of the background image B9 to the text image B7 is, for example, approximately 50% because the background image B9 has a smaller size than the text image B7 although the background image B9 is a surface. Here, for example, in a case where the size ratio threshold is prescribed as 30%, the information determination unit 103 determines that the text image B7 expresses the prescribed information because the size ratio is lower than the size ratio threshold, and determines that the background image B9 does not express the prescribed information because the size ratio is equal to or higher than the size ratio threshold.

Meanwhile, for example, in a case where a new code or the like is prepared, a size ratio of an area surrounded by the new code may be lower than the size ratio threshold even though the size ratio threshold is prescribed as described above.

Here, in a case where an inner edge of the first common color area is in contact with a third common color area and a hue range of the third common color area is common to the second common color area, the information determination unit 103 may determine that the third common color area does not express the prescribed information even though a size ratio of the third common color area to the first common color area is lower than the size ratio threshold. In the example of FIG. 11, in a case where it is assumed that the text image B7 is the first common color area, the background image B8, which is in contact with the outer edge of the text image B7, becomes the second common color area, and the background image B9, which is in contact with the inner edge of the text image B7, becomes the third common color area.

Here, for example, it is assumed that the size ratio threshold is prescribed as 60%. In a case where it is assumed that the size ratio of the third common color area to the first common color area, that is, the size ratio of the background image B9 to the text image B7 is 50% as described above, the size ratio is lower than the size ratio threshold. However, since it is apparent that the background images B8 and B9 have the common hue range, the information determination unit 103 determines that the background image B9, which is the third common color area, does not express the prescribed information even though the size ratio is lower than the size ratio threshold.

Meanwhile, in the modification example, the hue range of the color of the pixel of the conversion source in the second conversion process may be changed. Here, the color conversion unit 104 enlarges the hue range of the color of the pixel of the conversion source in the second conversion process, for example, as the size ratio of the first common color area to the second common color area is higher.

FIG. 12 illustrates an example of the hue range table of the modification example. In the example of FIG. 12, the size ratio of the first common color area to the second common color area, such as "lower than J11", "equal to or higher than J11 and is lower than J12", or "equal to or higher than J12" is associated with the information which indicates the hue range such as "±15°", "±20°", or "±25°". The color conversion unit 104 performs the second conversion process using the hue range, which is associated with the size ratio of the first common color area to the second common color area that is calculated based on the area information supplied from the information determination unit 103 in the hue range table, as the hue range of the color of the pixel of the conversion source.

A probability that the first common color area is the text, that is, a probability that the prescribed information is expressed is high as the size ratio is lower. In contrast, a probability that the first common color area expresses the prescribed information is low as the size ratio is higher. Therefore, in a case where the hue range is caused to be enlarged as the size ratio is higher, convenience of the color conversion is increased by enlarging an area where it is possible to perform the bath conversion on the colors for the common color area which does not express the prescribed information while suppressing the loss of the information, compared to a case where the hue range of the color of the pixel of the conversion source is uniform in the second conversion process.

2-4. Location of Common Color Area

The information determination unit 103 may perform determination using a method different from each of the above-described examples. For example, in a business document, dispositions of a date, an address, a writer name, a title, a document body, and the like are approximately determined. In addition, even in a case of a presentation material, there is a case where dispositions of a title and the document body for each page are approximately determined. In addition, even in a case of a report, entry places of a text, a numerical character, and the like are approximately determined according to a type (a delivery statement, an order sheet, a bill, or the like).

In the modification example, determination is performed using the disposition of the information. The information determination unit 103 according to the modification example determines that the common color area expresses the prescribed information in a case where a distance between a location of the common color area and a specific location in the target image is shorter than a threshold. The threshold is referred to as a "distance threshold" in order to distinguish from another threshold. The distance threshold is an example of a "third threshold" according to the Example of the present invention. The information determination unit 103 stores specific location information, which indicates a specific location in the target image, for each type of an image.

Figure 13A:
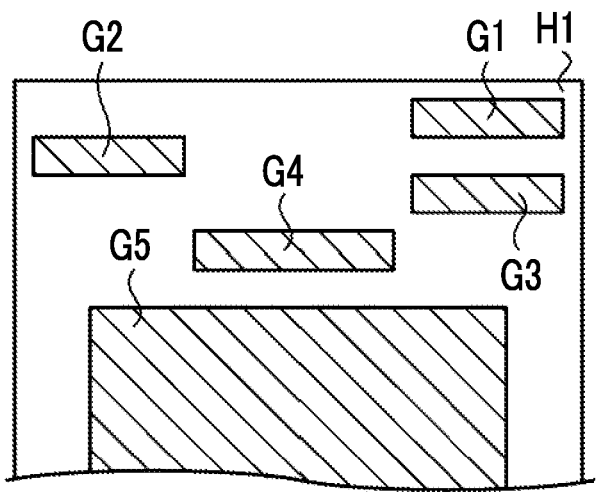
FIGS. 13A and 13B are diagrams illustrating examples of specific location information.
Figure 13B:
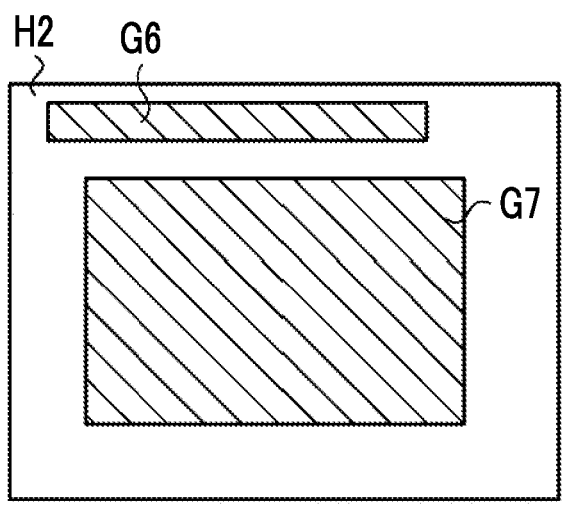

FIGS. 13A and 13B illustrate examples of the specific location information. FIG. 13A illustrates specific location information H1 of the business document. The specific location information H1 illustrates a description area G1 which describes a date or the like at an upper right of the image, a description area G2 which describes an address or the like at an upper left of the image, a description area G3 which describes a writer or the like below the description area G1, a description area G4 which describes a title below the description area G3 at a center of the image in a horizontal direction, and a description area G5 which describes the document body below the description area G4.

FIG. 13B illustrates specific location information H2 of a presentation document. The specific location information H2 illustrates a description area G6 which describes the title of each page, and a description area G7 which describes the document body of each page. In the modification example, the image acquisition unit 101 acquires the target image and type information which indicates a type of the target image. The type information may be input or selected, for example, in a case where the user designates the target image, and may be determined by the image acquisition unit 101 based on the image data which indicates the target image.

For example, in a case where a file name includes a fixed word, such as an "issue of", a "report", a "notification", or the like, the image acquisition unit 101 determines the file as the business document. In a case where a file type is used for an application for presentation, the image acquisition unit 101 determines the file as the presentation document. The image acquisition unit 101 supplies the acquired target image and the type information to the information determination unit 103. The information determination unit 103 reads the specific location information of the type of the target image indicated by the supplied type information.

Subsequently, the information determination unit 103 calculates, for example, a central location of the common color area, and calculates a distance between the central location and the description area indicated by the read specific location information as a distance from the specific location. In a case where the calculated distance is shorter than the distance threshold, the information determination unit 103 determines that the common color area expresses the prescribed information. For example, an average size of the texts, which are used in a plurality of target images, is investigated as the distance threshold, and a value corresponding to a half of a width or a height is used.

In a case where the text is described in the description area, there is a low probability that the distance from the specific location is equal to or longer than the distance threshold even though the text somewhat protrudes from the description area. That is, in a case where the distance from the specific location is shorter than the distance threshold, there is a high probability that the text described in the location. As described above, in the modification example, determination is performed based on the location of the common color area. Therefore, the area which expresses the prescribed information is determined without performing the image recognition process (text recognition process) which is described in the modification example.

Meanwhile, in the modification example, the hue range of the color of the pixel of the conversion source may be changed in the second conversion process. In this case, the information determination unit 103 notifies the color conversion unit 104 of the calculated distance between the location of the common color area and the specific location in the target image. The color conversion unit 104 causes the hue range of the color of the pixel of the conversion source in the second conversion process to be enlarged as the notified distance is longer, that is, the distance between the location of the common color area and the specific location in the target image is longer.

Figures 14, 15:
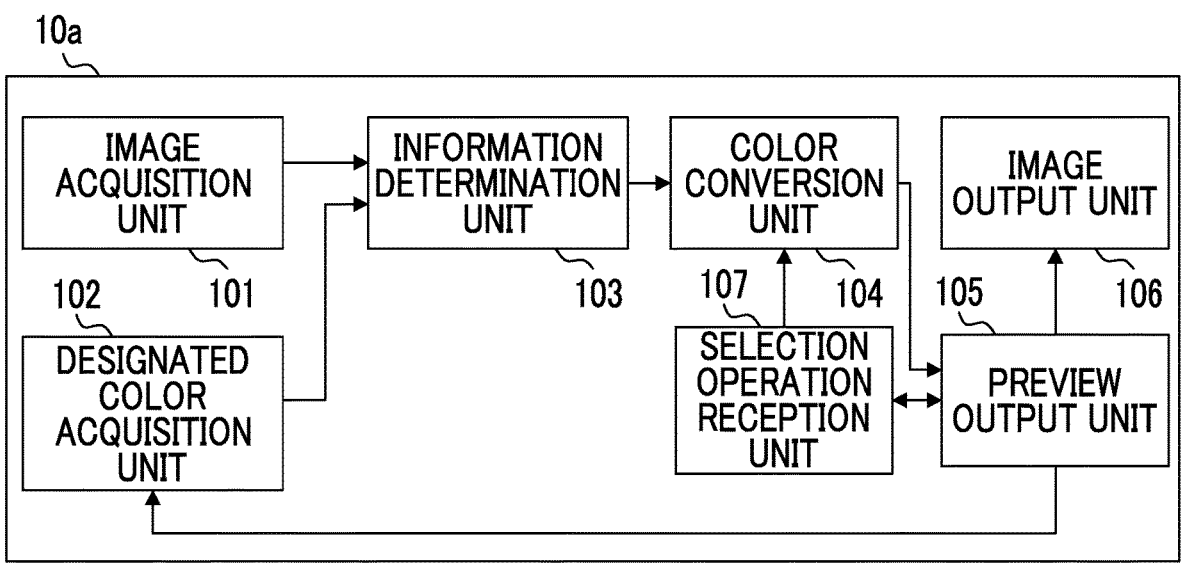
FIG. 14 is a diagram illustrating an example of the hue range table according to the modification example.
FIG. 15 is a diagram illustrating a functional configuration realized by an image processing device according to the modification example.

FIG. 14 illustrates an example of the hue range table according to the modification example. In the example of FIG. 14, the distance between the location of the common color area and the specific location in the target image, such as "shorter than K11", "equal to or longer than K11 and is shorter than K12", or "equal to or longer than K12", is associated with the information which indicates the hue range, such as "±15°", "±20°", or "±25°". The color conversion unit 104 performs the second conversion process while using the hue range, which is associated with the distance notified as described above in the hue range table, as the hue range of the color of the pixel of the conversion source.

As the distance is long, a probability that the common color area is the text, that is, a probability that the prescribed information is expressed is low. In contrast, as the distance is shorter, the probability that the common color area expresses the prescribed information is high. Therefore, in a case where the hue range is enlarged as the distance is longer, the convenience of the color conversion is increased, compared to a case where the hue range of the color of the pixel in the conversion source is uniform in the second conversion process, by enlarging an area in which it is possible to perform the batch conversion on the colors for the common color area, which does not express the prescribed information, while suppressing the loss of the information.

2-5. Prescribed Information

In the Example, the information expressed using the text is used as the prescribed information. However, the prescribed information is not limited thereto. In the modification example, information expressed in the background of the text is used as the prescribed information. The information expressed in the background is, for example, an input field (an area, surrounded by a ruled line, or the like) of a report or the like.

Here, the information determination unit 103 determines to express the prescribed information in a case where the size of the common color area of the hue range is equal to or larger than the size threshold while using the hue range of the designated color, which is acquired by the designated color acquisition unit 102, as the above-described common hue range (hue range of the pixels which express the common color area). Therefore, for example, in a case where input fields of the report, the application document, and the like are expressed using the same system colors and one of the colors is designated, the size of the common color area corresponding to the designated color is larger than the size threshold, and thus it is determined to express the prescribed information, thereby performing the first conversion process.

In contrast, in a case where a color of the text described in the input field is designated, the size of the common color area corresponding to the designated color is smaller than the size threshold, and thus it is determined to not express the prescribed information, thereby performing the second conversion process.

Meanwhile, in the modification example, the above-described text recognition technology may be used instead of the size of the common color area. Here, the information determination unit 103 determines to express the prescribed information in a case where the above-described common color area does not express the text. Here, similar to the case where determination is performed using the size of the common color area, it is easy to reuse a format (formula) of the report and the application document. In addition, even in a format, in which a large text that has a size equal to or larger than the size threshold is input, the color conversion is performed on the text and the text is reused.

In addition, similar to the above-described modification example, the hue range may be changed. For example, the color conversion unit 104 causes the hue range of the color of the pixel of the conversion source in the second conversion process to be narrow as the size of the common color area is larger. Here, the color conversion unit 104 may use, for example, a hue range table (in order of "±25°", "±20°", and "±15°" from above) in which an order of information indicative of the hue range is contrary to that of the hue range table illustrated in FIG. 10.

Therefore, the common color area, which has a large size and in which there is a high probability of expressing the information (the input field or the like of the report) of the background, tends to remain after the color conversion is performed, and it is easy to reuse the format (formula) thereof. In addition, in the modification example, similar to the above-described modification example, the location of the common color area may be used. Here, in a case where the distance between the location of the common color area and the specific location in the target image is longer than the distance threshold, the information determination unit 103 determines that the common color area expresses the prescribed information.

In a case where the determination is performed, the first conversion process is performed because it is determined that a background part other than the text expresses the prescribed information. However, the second conversion process is easily performed because it is determined that the text does not express the prescribed information.

In addition, as the distance between the location of the common color area and the specific location in the target image is longer, the color conversion unit 104 may cause the hue range of the color of the pixel of the conversion source to be narrow in the second conversion process. As the distance is longer, a probability that the common color area expresses the information (the input field or the like of the report) of the background, that is, a probability that the prescribed information is expressed is high.

2-6. Process Selection by User

The color conversion unit 104 may perform a color conversion process which is selected from the first conversion process and the second conversion process by the user.

FIG. 15 illustrates a functional configuration realized by an image processing device 10a according to the modification example. The image processing device 10a includes a selection operation reception unit 107 in addition to the respective units illustrated in FIG. 2.

The selection operation reception unit 107 receives a user operation of selecting the color conversion process, which is performed by the color conversion unit 104, from the first conversion process and the second conversion process. Alternatives of the selection operation are included in, for example, the preview image.

Figure 16:
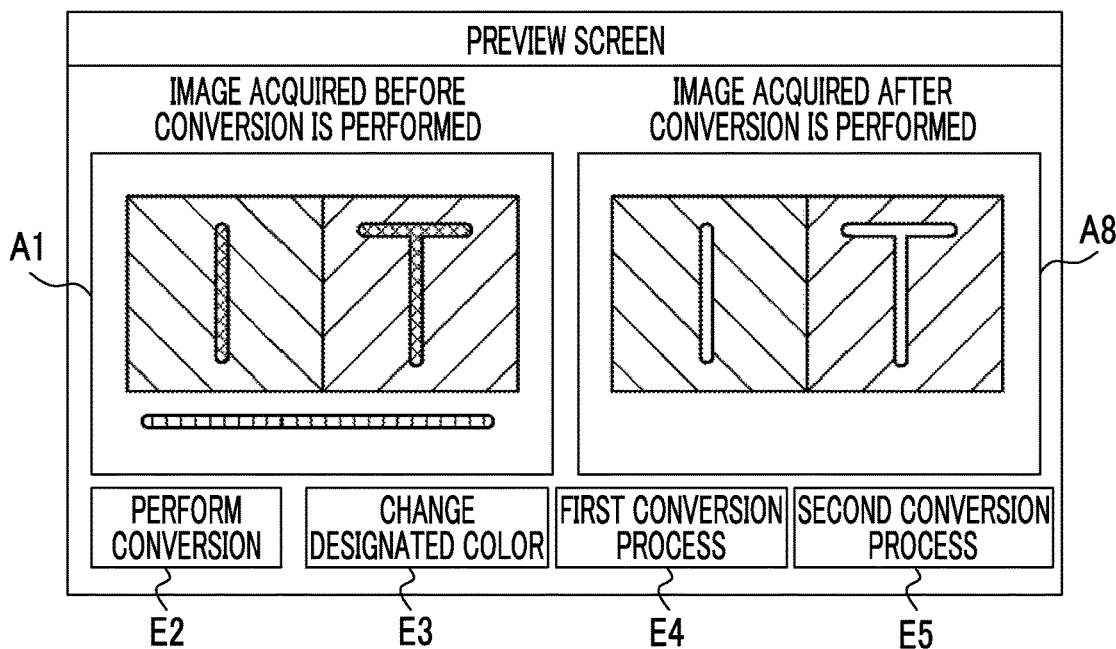
FIG. 16 is a diagram illustrating an example of a preview image according to the modification example.

FIG. 16 illustrates an example of the preview image according to the modification example. In the example of FIG. 16, the panel 16 displays an operator E4, in which "first conversion process" is written, and an operator E5, in which "second conversion process" is written, on the preview screen, in addition to the respective images illustrated in FIG. 7.

The selection operation reception unit 107 receives an operation of selecting the operator E4 as an operation of selecting the first conversion process, and receives an operation of selecting the operator E5 as an operation of selecting the second conversion process. The selection operation reception unit 107 notifies the color conversion unit 104 of the color conversion process selected through the received operation. The color conversion unit 104 performs only the notified color conversion process, that is, the process selected from the first conversion process and the second conversion process by the user with respect to the common color area.

FIG. 16 illustrates the target image A8, which is acquired after conversion is performed, in a case where the designated color is the color of blue and the user selects the second conversion process. In a case where the designated color is the color of blue, conversion is normally performed into the target image A2 illustrated in FIG. 6A. However, in a case where the second conversion process is selected, conversion is performed into the target image A8 illustrated in FIG. 9B. According to the modification example, the color conversion process, which matches with the preference of the user, is performed as described above, regardless whether or not the common color area expresses the prescribed information.

2-7. Selection History of User

In the modification example, the color conversion process may be performed using a process often selected from the first conversion process and the second conversion process by the user.

Figure 17:
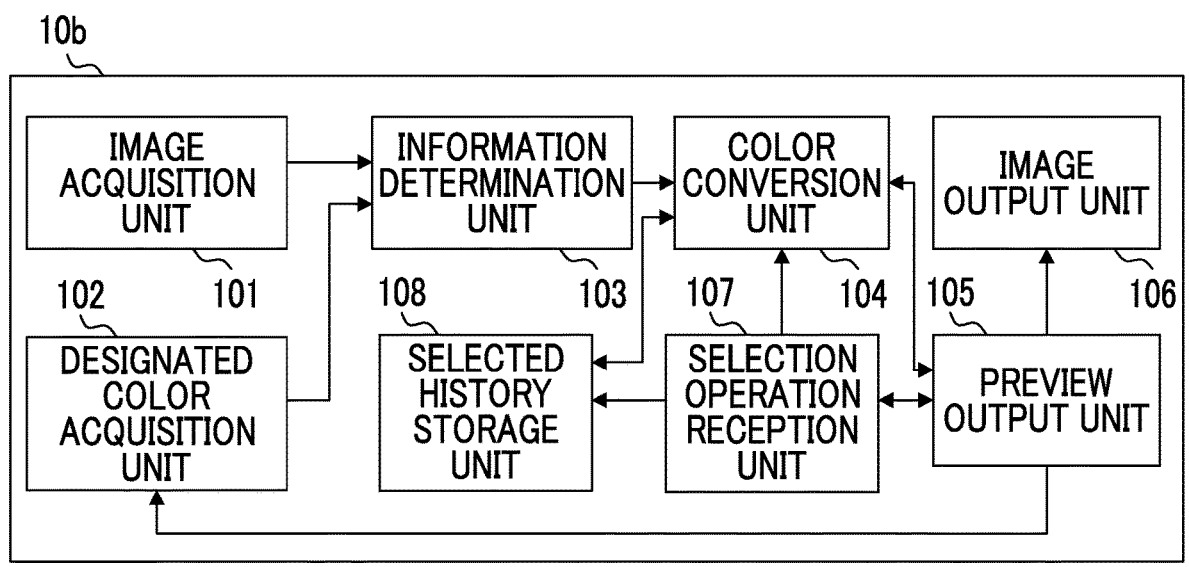
FIG. 17 is a diagram illustrating the functional configuration realized by the image processing device according to the modification example.

FIG. 17 illustrates a functional configuration realized by an image processing device 10b according to the modification example. The image processing device 10b includes a selected history storage unit 108 in addition to the respective units illustrated in FIG. 15.

In the modification example, whenever the selection operation reception unit 107 receives the user operation selected from the first conversion process and the second conversion process, information (processing ID) which indicates the selected color conversion process is supplied to the selected history storage unit 108. Meanwhile, since the image processing device 10b is used by a plurality of users, a user ID of the user who is performing the operation is identified by an operation, such as login, and thus the selection operation reception unit 107 supplies a processing ID in association with the user ID.

The selected history storage unit 108 stores the supplied processing ID and the user ID as a history of the color conversion process (any of the first conversion process and the second conversion process) which is selected by the user identified using the user ID. In the modification example, in a case where the selection operation reception unit 107 does not receive the operation selected by the user, that is, in a case where the color conversion process is not selected by the user, the color conversion unit 104 performs the color conversion process which is more selected by the user in the past.

For example, in a case where the area information and the result of determination are supplied from the information determination unit 103, the color conversion unit 104 generates image data, which indicates the new target image, by performing the first conversion process or the second conversion process as described in the Example. In addition, here, since the color conversion process is not selected by the user, the color conversion unit 104 refers to the selected history storage unit 108 and counts the number of processing IDs which are selected in the past by the user who is performing the operation. The color conversion unit 104 performs the color conversion process, which is identified by the processing ID whose counted number is large, with respect to the common color area, and generates the image data which indicates the new target image.

The color conversion unit 104 supplies two image data, which are generated as above, to the preview output unit 105.

Figure 18:
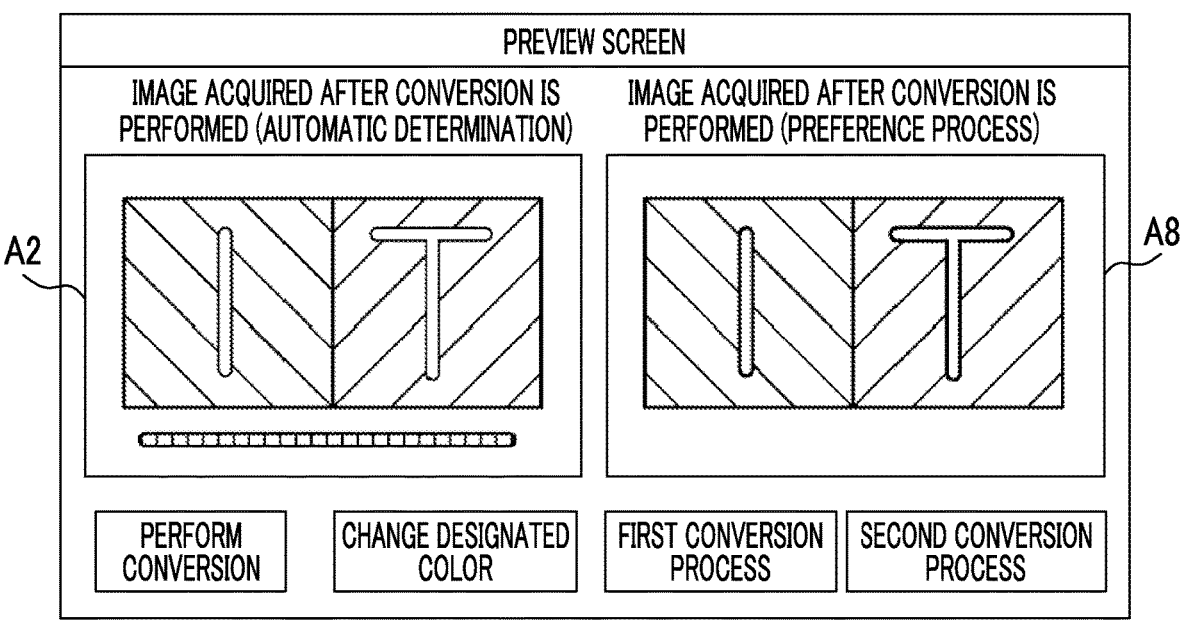
FIG. 18 is a diagram illustrating an example of the preview image according to the modification example.

FIG. 18 illustrates an example of the preview image according to the modification example. In the example of FIG. 18, the panel 16 displays the target image A2 as the image, which is acquired after conversion is performed through the color conversion process selected based on the determination (automatic determination) performed by the information determination unit 103, on the preview screen, and displays the target image A8 as the image acquired after the conversion through the color conversion process (preference process) which is more selected by the user in the past.

As described above, in the modification example, the color conversion process which is more selected in the past, that is, the color conversion process which matches with the preference of the user, is performed regardless whether or not the common color area expresses the prescribed information. In addition, in the example of FIG. 18, in a case where the user selects a favorite target image and operates the operator E2 in which "perform conversion" is written, a target image, on which a color conversion process that matches with a current target image is performed in a process in the above-described automatic determination and the preference process, is output.

2-8. Selection of Determination Method

In the Example, the information determination unit 103 determines the information expressed using the text as the prescribed information. In the modification example, the information determination unit 103 determines the information expressed using an image other than the text (for example, the background of the text) as the prescribed information. The user may select which determination method to be used. In the modification example, the selection operation reception unit 107 illustrated in FIG. 17 receives a determination method selection operation performed by the user.

Figure 20:
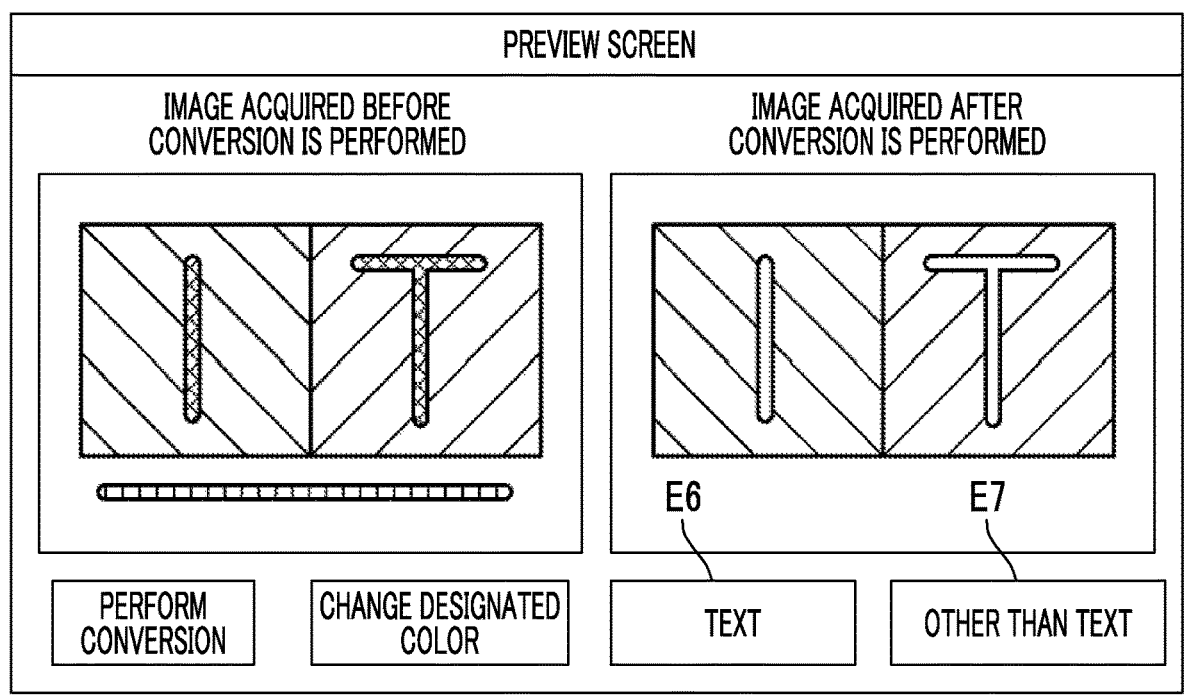
FIG. 20 is a diagram illustrating an example of the preview image according to the modification example.

FIG. 20 illustrates an example of a preview image according to the modification example. In the example of FIG. 20, the panel 16 displays an operator E6, in which "text" is written, and an operator E7, in which "other than text" is written, on the preview screen in addition to the respective images illustrated in FIG. 7. The selection operation reception unit 107 receives an operation performed on the operator E6 as a determination method selection operation according to the Example, and receives an operation performed on the operator E7 as a determination method selection operation according to the modification example.

The information determination unit 103 performs determination using a method selected by the user from the determination method (a method of determining that the common color area expresses the prescribed information in a case where the common color area expresses the text) according to the Example and the determination method (a method of determining that the common color area expresses the prescribed information in a case where the common color area does not express the text) according to the modification example. In addition, in the modification example, the selected history storage unit 108 stores a history of the determination method selected by the user.

In a case where the selection operation reception unit 107 does not receive the determination method selection operation performed by the user, the information determination unit 103 performs determination based on histories accumulated in the selected history storage unit 108. Specifically, the information determination unit 103 refers to the selected history storage unit 108, and performs determination using a determination method, which is more selected by the user in the past, from the determination method according to the Example and the determination method according to the modification example. Therefore, determination is performed using a method which matches a situation (a situation in which it is desired to prevent the background from being viewed, a situation in which it is desired to remain a format and to prevent the text from being viewed, or the like) that is frequently used by the user.

2-9. Color Conversion in Phases

In the Example, the color conversion unit 104 completely converts a target pixel (a pixel corresponding to a designated color or a pixel corresponding to a color in the wider hue range than the designated color) into a specific color in either the first conversion process or the second conversion process. However, a color acquired after conversion is performed may be changed in phases. The change in phases means that, for example, in a case where a color of white is converted into a color of black, the white is converted into any of a color of pale gray, a color of gray, a color of dark gray, and the color of black (a plurality of colors which approach the color of black from the color of white in phases) for each pixel.

In a case where the specific color is the color of white, the color of gray, or the color of black, the color is converted in phases as described above by causing the saturation value and the lightness value to be close to specific color in phases without changing the hue value. In addition, in a case where conversion is performed from the color of red to the color of green, conversion is performed into any of the color of red, the color of orange, the color of yellow, the color of yellow green, and the color of green (a plurality of colors which approach the color of green from the color of red in phases) for each pixel. In a case where the specific color has a hue value as described above, conversion is performed on the color in phases by causing the hue value to be close to the specific color in phases without changing the saturation value and the lightness value.

In the modification example, in the second conversion process, the color conversion unit 104 performs conversion on a pixel, which has a larger hue difference from the designated color acquired by the designated color acquisition unit 102, into a color in a phase which is close to an original color in a case where the color is changed in phases from the original color to the specific color.

Figure 19A:
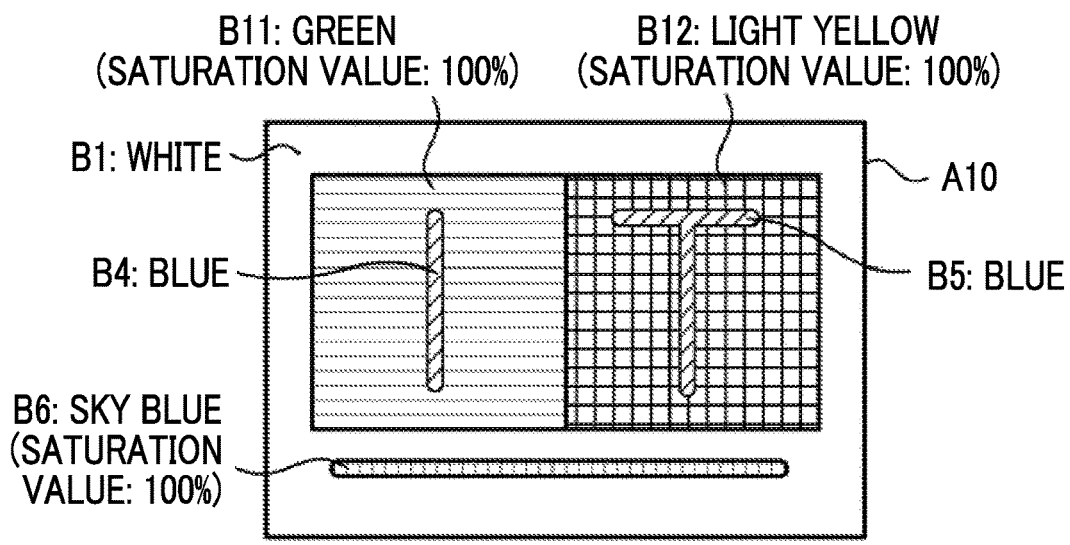
FIGS. 19A and 19B are diagrams illustrating examples of a target image acquired before and after a color conversion process according to the modification example is performed.
Figure 19B:
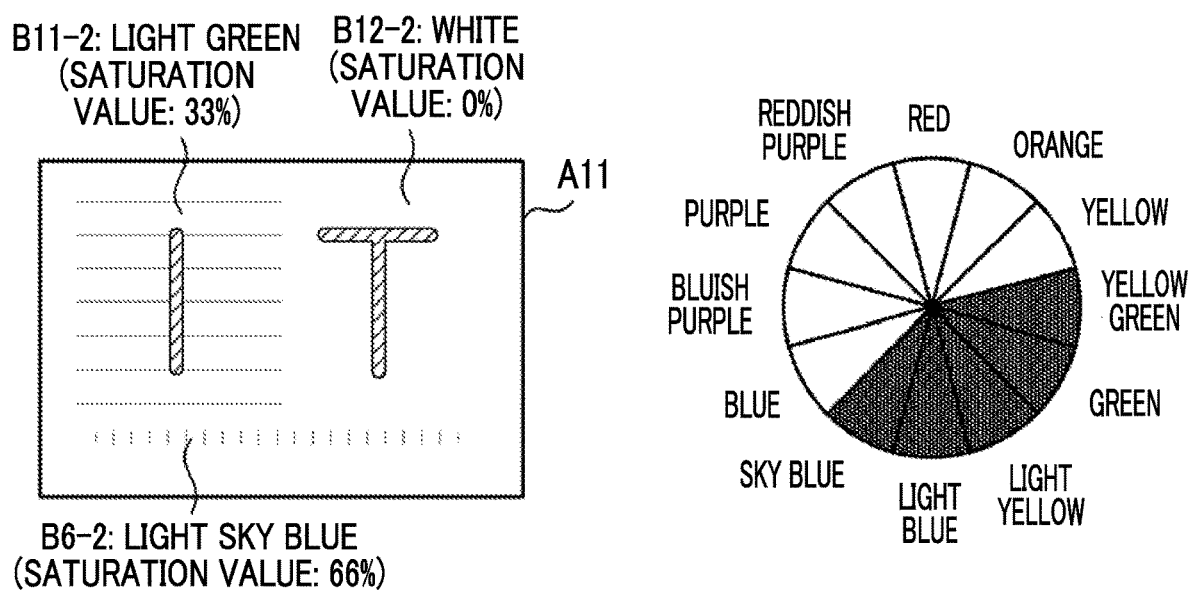

FIGS. 19A and 19B illustrate examples of the target image acquired before and after the color conversion process is performed according to the modification example. FIG. 19A illustrates a target image A10 acquired before performing the color conversion process of changing the background images B2 and B3 of the target image A1 illustrated in FIG. 5 to a background image B11 having the color of green and a background image B12 having the color of light yellow.

It is assumed that every saturation value of an image having the hue value is 100% in the target image A10. The color of light yellow is designated as the designated color for the target image A10. Here, since the background image B12 having the color of light yellow does not express the prescribed information, the color conversion unit 104 performs the second conversion process. In the modification example, the color conversion unit 104 performs the second conversion process while using a hue range, which includes two colors next to the designated color designated color (the "color of yellow green", the "color of green", the "color of light yellow", the "color of light blue", and the "color of sky blue" in a case where the designated color is the "color of light yellow") as the wider hue range than the designated color.

First, the color conversion unit 104 completely converts the background image B12, which does not have a hue difference from the designated color (color of light yellow), into a background image B12-2 which has the specific color (the color of white: saturation value 0%), as illustrated in FIG. 19B. In addition, the color conversion unit 104 converts the background image B11 having the color of green, which has the hue difference from the designated color, into a background image B11-2 having a color (a color of pale green: a saturation value of 33%) in a phase which is close to the original color rather than the color of complete white. In addition, the color conversion unit 104 converts the underline image B6 having the color of sky blue, which has the hue difference from the designated color, into the underline image B6-2 having a color (a color of pale sky blue: a saturation value of 66%) in the phase which is close to the original color rather than the color of complete white.

The color of green has a hue difference of 30° from the designated color, and the color of sky blue has a hue difference of 60° from the designated color. That is, compared to the background image B11, the underline image B6 has the larger hue difference from the designated color. Therefore, the color conversion unit 104 performs the conversion on the underline image B6-2 (a saturation value of 66%) into a color in a phase which is close to the original color, compared to the background image B11-2 (a saturation value of 33%). As illustrated in the example of FIGS. 19A and 19B, as the hue range used in the second conversion process is enlarged, there is a high probability that color conversion is also performed on the common color area, such as the underline image B6, which expresses the prescribed information.

In contrast, a color, which has a large difference in the hue value from the color of the background, tends to be used as the color of the image which expresses the prescribed information so as to be distinguished from the color of the background. Accordingly, in a case where the user designates the color of the background as the designated color, there is a high probability that the background is the common color area which expresses the prescribed information as the hue difference from the designated color is large. In the modification example, the common color area is converted into a color which is close to the original color.

2-10. Color of Determination Target

In the Example, the information determination unit 103 determines that the hue range of the acquired designated color as a common hue range. However, the common hue range is not limited thereto. The hue range of a color which is not the designated color may be determined as the common hue range. In the modification example, the designated color information, which is acquired by the designated color acquisition unit 102, is supplied to the color conversion unit 104.

For example, in a case of the target image A1 illustrated in FIG. 5, the information determination unit 103 performs determination for all the common color areas (the outer frame image B1, the background images B2 and B3, the text images B4 and B5, and the underline image B6) regardless of whether or not the common color area corresponding to the designated color. The information determination unit 103 supplies the area information, which expresses each common color area, and each result of determination to the color conversion unit 104. In a case where the common color area, which is determined to express the prescribed information, has the designated color, color conversion unit 104 performs the first conversion process, similar to the Example.

In addition, in a case where common color area, which is determined to not express the prescribed information, has the designated color, the color conversion unit 104 performs the second conversion process similar to the Example. In addition, in a case where every common color area included in target image A1 does not have the designated color, the color conversion unit 104 performs the following two countermeasure. In a first countermeasure method, the color conversion unit 104 does not perform the color conversion process (in the Example, in this case, the color conversion process is not performed as described in the example of FIG. 6D) because the common color area is not the color conversion target.

In the second countermeasure method, the color conversion unit 104 performs the second conversion process on an area where, in a case where the second conversion process is performed, it is determined that the common color area, on which the color conversion is performed as a result, does not express the prescribed information. For example, in the example of FIG. 6D, in a case where the common color area corresponding to the "color of green" which is the designated color does not exist and conversion is performed on colors from the color of yellow green, in which the hue range is wider than the designated color, to the color of light yellow, into the specific color (white), the color conversion is performed on the background image B3 having the color of yellow green, that is, an area which is determined to not express the prescribed information. Therefore, the color conversion unit 104 performs the second conversion process without change.

Figure 6D:
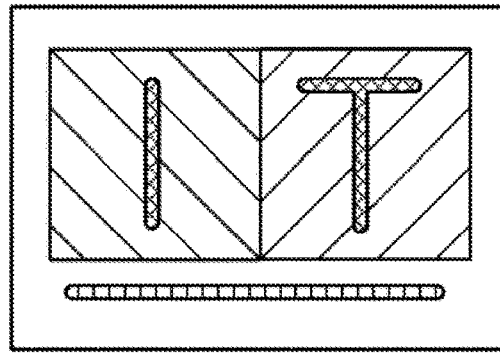
Figure 6D:
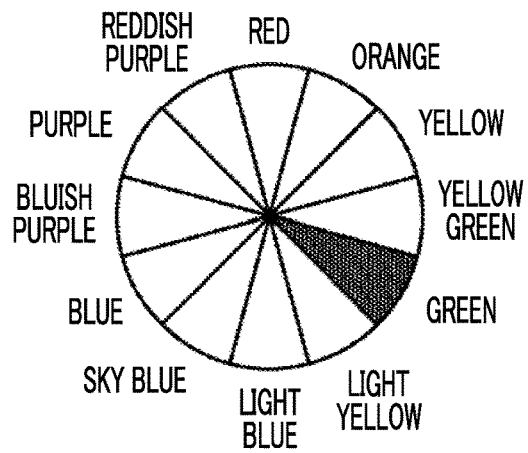

In addition, for example, in a case where the "color of light blue" is designated instead of the "color of green" in the example of FIG. 6D, the common color area corresponding to the "color of light blue" which is the designated color does not exist and conversion is performed on colors from the color of light yellow in the hue range, which is wider than the designated color, to the color of sky blue into the specific color (white), the color conversion is performed on the underline image B6 having the color of sky blue, that is, the area which is determined to express the prescribed information. Therefore, the color conversion unit 104 does not perform the second conversion process.

In a case where the second countermeasure method is used, the color conversion unit 104 performs the second conversion process of converting a pixel corresponding to a color in the wider hue range than the designated color into the specific color with respect to only the common color area, which is determined to not express the prescribed information, even in a case where the common color area corresponding to the designated color does not exist. Meanwhile, in a case where it is assumed that the second conversion process is performed, as a result, conversion may be performed on both the common color area which expresses the prescribed information and the common color area which does not express the prescribed information (for example, in a case where the background image B3 and the underline image B6 have the same color).

Here, the color conversion unit 104 may perform the second conversion process of converting the pixel corresponding to the color in the wider hue range than the designated color into the specific color with respect to only the common color area which is determined to not express the prescribed information. The color conversion unit 104 performs the second conversion process on only the background image B3, which is determined to not express the prescribed information, because, for example, the background image B3 and the underline image B6 have the same color.

In the modification example, in every above-described case, similar to the Example, it is possible to perform the batch conversion on the colors of the close color area while preventing the amount of information to be from being large lost due to the color conversion (color conversion in which the range of a color to be converted may be change), compared to a case where the result of determination acquired by the information determination unit 103 is not taken into consideration.

2-11. Color Expressing Method

In the Example, although the colors are expressed using the HSL model, the present invention is not limited thereto. For example, the colors may be expressed using a Hue, a Saturation, and a Brightness (HSB) model, a Lab color space, or the like. In brief, colors may be expressed using any method in a case of a method of expressing a degree in which colors are similar to each other using a numerical value.

2-12. Each Function Realization Method

In each of the functions illustrated in FIG. 2 or the like, two or more functions may be integrated, and one function may be divided into two or more function. In addition, an operation which is performed by a certain function may be performed by another function. In addition, each of the functions is not limited to be realized by only the image processing device, and may be realized by two or more devices (that is, a system) which include the image processing device. In brief, in a case where a function, which is equivalent to each of the functions illustrated in FIG. 2 or the like, is realized in the whole device or system, any method of realizing the function may be used.

2-13. Category of Invention

The present invention is applied to the image processing device 10, which includes the image reading section and the image forming section, in Example. However, the present invention is not limited thereto. For example, the present invention may be applied to an information processing apparatus, such as a personal computer, a smart phone, or a tablet terminal, which does not include both the image reading section and the image forming section. Here, the color conversion target image may be acquired from the external device or may be generated in the information processing apparatus.

In addition, the present invention is understood as an information processing method used to realize a process performed by each information processing apparatus, and is understood as a program causing a computer, which controls each device, to perform a function. The program may be provided in a form of a recording medium, such as an optical disk, which stores the program, or may be provided in a form which is downloaded to a computer through a communication line, such as the Internet, and makes available by installing the program.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus, comprising:
    a processor, configured to:
        acquire a designated color which is designated as a color, which is converted into a specific color, of a pixel among pixels which express an image;
        determine whether or not a common color area, which is expressed by pixels in a common hue range, expresses prescribed information in the image; and
        perform a first conversion process of converting a pixel corresponding to the acquired designated color into a specific color in the common color area which is determined to express the prescribed information, and perform a second conversion process of converting a pixel corresponding to a color in a wider hue range than the designated color into a specific color in the common color area which is determined to not express the prescribed information,
    wherein the processor determines that the common color area expresses the prescribed information in a case where the common color area expresses text.

2. The information processing apparatus according to claim 1,
    wherein the processor determines a hue range of the acquired designated color as the common hue range.

3. The information processing apparatus according to claim 2,
    wherein the processor further determines that the common color area expresses the prescribed information in a case where a size of the common color area is smaller than a first threshold.

4. The information processing apparatus according to claim 1,
    wherein the processor further determines that the common color area expresses the prescribed information in a case where a size of the common color area is smaller than a first threshold.

5. The information processing apparatus according to claim 4,
    wherein the processor enlarges a hue range of a color of a pixel of a conversion source in the second conversion process as the size is larger.

6. The information processing apparatus according to claim 1,
    wherein the processor further determines that a first common color area expresses the prescribed information in a case where an outer edge of the first common color area is in contact with a second common color area and a size ratio of the first common color area to the second common color area is lower than a second threshold.

7. The information processing apparatus according to claim 6,
    wherein the processor further determines that a third common color area does not express the prescribed information in a case where an inner edge of the first common color area is in contact with the third common color area and a hue range of the third common color area is common to the second common color area even though a size ratio of the third common color area to the first common color area is lower than the second threshold.

8. The information processing apparatus according to claim 6,
    wherein the processor enlarges a hue range of a color of a pixel of a conversion source in the second conversion process as the size ratio is higher.

9. The information processing apparatus according to claim 1,
    wherein the processor further determines that the common color area expresses the prescribed information in a case where a distance between a location of the common color area and a specific location in the image is shorter than a third threshold.

10. The information processing apparatus according to claim 9,
    wherein the processor enlarges a hue range of a color of a pixel of a conversion source in the second conversion process as the distance is longer.

11. The information processing apparatus according to claim 1,
    wherein the processor further determines that the common color area expresses the prescribed information in a case where a size of the common color area is equal to or larger than a first threshold.

12. The information processing apparatus according to claim 11,
    wherein the processor narrows the hue range of the color of the pixel of the conversion source in the second conversion process as the size is larger.

13. The information processing apparatus according to claim 1,
    wherein the processor further determines that the common color area expresses the prescribed information in a case where a distance between a location of the common color area and a specific location in the image is equal to or longer than a third threshold.

14. The information processing apparatus according to claim 13,
  wherein the processor narrows a hue range of a color of a pixel of a conversion source in the second conversion process as the distance is longer.

15. The information processing apparatus according to claim 1,
  wherein the processor performs only one, which is selected by a user, of the first conversion process and the second conversion process, and performs a process which is frequently selected in a past in a case where the user does not perform selection.

16. The information processing apparatus according to claim 1,
  wherein the processor converts a pixel, which has a larger hue difference from the designated color, into a color in a phase which is close to an original color in a case where the color is changed in phases from the original color to the specific color in the second conversion process.

17. A non-transitory computer readable medium storing a program causing a computer to:
  acquire a designated color which is designated as a color, which is converted into a specific color, of a pixel among pixels which express an image;
  determine whether or not a common color area, which is expressed by pixels in a common hue range, expresses prescribed information in the image; and
  perform a first conversion process of converting a pixel corresponding to the acquired designated color into a specific color in the common color area which is determined to express the prescribed information, and perform a second conversion process of converting a pixel corresponding to a color in a wider hue range than the designated color into a specific color in the common color area which is determined to not express the prescribed information,
  wherein the common color area is determined to express the prescribed information in a case where the common color area expresses text.

* * * * *